US009602749B2

(12) United States Patent
Yamaguchi et al.

(10) Patent No.: US 9,602,749 B2
(45) Date of Patent: Mar. 21, 2017

(54) IMAGE SENSOR, CONTROL METHOD, AND ELECTRONIC APPARATUS

(71) Applicant: Sony Corporation, Tokyo (JP)

(72) Inventors: Kazunori Yamaguchi, Kanagawa (JP); Rei Yoshikawa, Kanagawa (JP); Koji Hizume, Kanagawa (JP); Daisuke Kawamata, Kanagawa (JP)

(73) Assignee: Sony Corporation, Tokyo (JP)

( * ) Notice: Subject to any disclaimer, the term of this patent is extended or adjusted under 35 U.S.C. 154(b) by 143 days.

(21) Appl. No.: 14/313,649

(22) Filed: Jun. 24, 2014

(65) Prior Publication Data

US 2015/0029373 A1    Jan. 29, 2015

(30) Foreign Application Priority Data

Jul. 25, 2013  (JP) ................................ 2013-154457

(51) Int. Cl.
| | |
|---|---|
| *H04N 5/335* | (2011.01) |
| *H04N 5/3745* | (2011.01) |
| *H04N 5/378* | (2011.01) |
| *H04N 9/04* | (2006.01) |

(52) U.S. Cl.
CPC ......... *H04N 5/37457* (2013.01); *H04N 5/378* (2013.01); *H04N 9/045* (2013.01)

(58) Field of Classification Search
CPC ..... H04N 5/37457; H04N 5/378; H04N 9/045
USPC ........................................ 348/308, 302–305
See application file for complete search history.

(56) References Cited

U.S. PATENT DOCUMENTS

| | | | | |
|---|---|---|---|---|
| 6,690,421 | B1* | 2/2004 | Yamada ............... | H04N 3/1575 348/272 |
| 2005/0018064 | A1* | 1/2005 | Itoh ...................... | H04N 3/1512 348/308 |
| 2011/0176045 | A1* | 7/2011 | Ahn .................. | H01L 27/14603 348/308 |
| 2013/0088624 | A1* | 4/2013 | Mo ........................ | H04N 5/355 348/300 |
| 2014/0375852 | A1* | 12/2014 | Ogino ............... | H01L 27/14627 348/294 |

FOREIGN PATENT DOCUMENTS

JP    2012-253624    12/2012

* cited by examiner

*Primary Examiner* — Sinh Tran
*Assistant Examiner* — Zhenzhen Wu
(74) *Attorney, Agent, or Firm* — Michael Best & Friedrich LLP

(57) ABSTRACT

There is provided an image sensor that includes a pixel array section, a column processing section, and a row control section. The pixel array section is configured to include two or more shared pixel cells arranged in a two-dimensional array, the shared pixel cells each including a plurality of pixels that output electric signals by photoelectric conversion. The column processing section is configured to process the electric signals that are read at the same time from the shared pixel cells on a plurality of rows in the two-dimensional array. The row control section is configured to perform access control differently between one and another of the rows for reading the electric signals from the pixels in the shared pixel cells.

17 Claims, 21 Drawing Sheets

IMAGE SENSOR, CONTROL METHOD, AND ELECTRONIC APPARATUS

CROSS REFERENCE TO RELATED APPLICATIONS

This application claims the benefit of Japanese Priority Patent Application JP 2013-154457 filed Jul. 25, 2013, the entire contents of which are incorporated herein by reference.

BACKGROUND

The present disclosure relates to image sensors, control methods, and electronic apparatuses, and relates to an image sensor adopting the pixel sharing technology, a control method, and an electronic apparatus with which high-speed imaging is achieved in the image sensor.

The recent type of image sensors is with a larger number of pixels, and expects a longer time for reading electric signals from pixels where photoelectric conversion is performed.

In consideration thereof, for the image sensors with a larger number of pixels, there is a technology proposed for imaging without reducing a frame rate, and a technology for high-speed imaging at a higher frame rate. As an example, refer to Japanese Patent Application Laid-open No. 2012-253624 (hereinafter, referred to as Patent Document 1).

For convenience in the below, the expression of high-speed imaging may include imaging without reducing the frame rate.

SUMMARY

The concern here is that the technology currently proposed for high-speed imaging is for pixels each using a piece of FD (Floating Diffusion) (hereinafter, such pixels are referred to as unit pixels), and thus is not necessarily appropriate for pixels that share (for use) a piece of FD (hereinafter, such pixels are referred to as shared pixel cells).

It is thus desirable to provide an image sensor capable of high-speed imaging with the shared pixel technology.

According to an embodiment of the present disclosure, there is provided an image sensor that includes a pixel array section, a column processing section, and a row control section. The pixel array section is configured to include two or more shared pixel cells arranged in a two-dimensional array, the shared pixel cells each including a plurality of pixels that output electric signals by photoelectric conversion. The column processing section is configured to process the electric signals that are read at the same time from the shared pixel cells on a plurality of rows in the two-dimensional array. The row control section is configured to perform access control differently between one and another of the rows for reading the electric signals from the pixels in the shared pixel cells.

According to another embodiment of the present disclosure, in an image sensor including a pixel array section configured to include two or more shared pixel cells arranged in a two-dimensional array, the shared pixel cells each including a plurality of pixels that output electric signals by photoelectric conversion, and a column processing section configured to process the electric signals that are read at the same time from the shared pixel cells on a plurality of rows in the two-dimensional array, there is provided a control method that includes performing access control differently between one and another of the rows for reading the electric signals from the pixels in the shared pixel cells.

According to still another embodiment of the present disclosure, there is provided an electronic apparatus that includes an optical system configured to gather light, and an image sensor configured to capture an image by receiving the light with a pixel array section configured to include two or more shared pixel cells arranged in a two-dimensional array, the shared pixel cells each including a plurality of pixels that output electric signals by photoelectric conversion, a column processing section configured to process the electric signals that are read at the same time from the shared pixel cells on a plurality of rows in the two-dimensional array, and a row control section configured to perform access control differently between one and another of the rows for reading the electric signals from the pixels in the shared pixel cells.

With the embodiments of the present disclosure, two or more shared pixel cells each including a plurality of pixels are arranged in a two-dimensional array. The pixels output electric signals by photoelectric conversion, and the electric signals read at the same time from the shared pixel cells on a plurality of rows in the two-dimensional array are processed. As to access control of reading the electric signals from the pixels in the shared pixel cells, the access control is performed differently between one and another of the rows.

Herein, the image sensor may be an independent apparatus, or may be an internal block being a part of an apparatus.

According to the embodiments of the present disclosure, high-speed imaging is achieved in an image sensor adopting the shared pixel technology.

Note that the effects described above are not necessarily restrictive, and may be any of those described in the present disclosure.

These and other objects, features and advantages of the present disclosure will become more apparent in light of the following detailed description of best mode embodiments thereof, as illustrated in the accompanying drawings.

DETAILED DESCRIPTION OF EMBODIMENT

Hereinafter, an embodiment of the present disclosure will be described with reference to the drawings.

[Digital Camera in Embodiment with Application of Present Disclosure]

Figure 1:
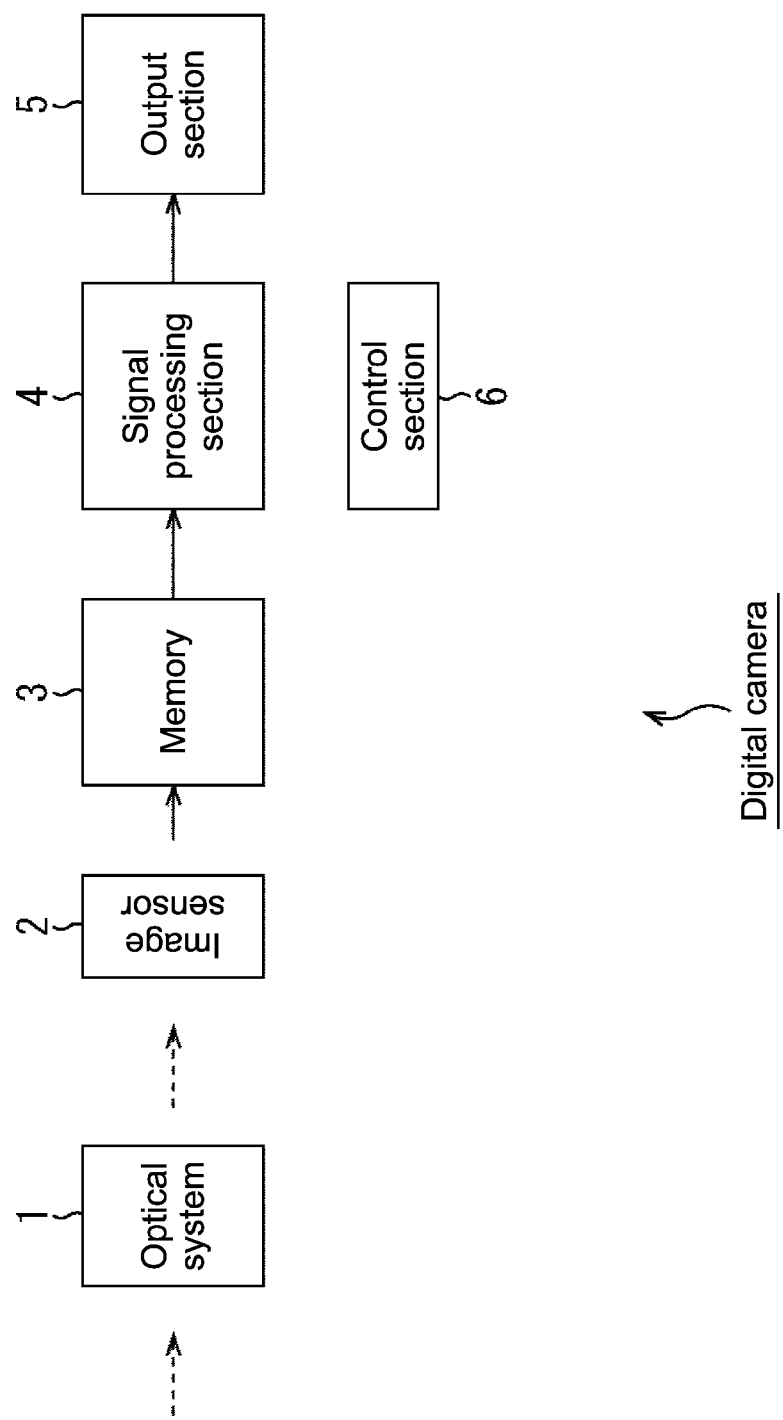
FIG. 1 is a block diagram showing an exemplary configuration of a digital camera in an embodiment with the application of the present disclosure.

FIG. 1 is a block diagram showing an exemplary configuration of a digital camera in an embodiment with the application of the present disclosure.

The digital camera is capable of capturing both still and moving images.

In FIG. 1, the digital camera includes an optical system 1, an image sensor 2, a memory 3, a signal processing section 4, an output section 5, and a control unit 6.

The optical system 1 includes a zoom lens, a focus lens, an aperture, and others (not shown), and directs external light into the image sensor 2.

The image sensor 2 is a CMOS (Complementary Metal Oxide Semiconductor) image sensor, for example. The image sensor 2 receives light coming from the optical system 1, and performs photoelectric conversion to output image data corresponding to the light from the optical system 1.

The memory 3 temporarily stores the image data provided by the image sensor 2.

The signal processing section 4 performs signal processing using the image data stored in the memory 3, e.g., noise removal, and white balance adjustment. The signal processing section 4 supplies the resulting image data to the output section 5.

The output section 5 outputs the image data provided by the signal processing section 4.

That is, the output section 5 includes a liquid crystal display (not shown), for example, and displays an image of the image data from the signal processing section 4 as a so-called through image.

The output section 5 also includes a driver (not shown) that drives a recording medium including a semiconductor memory, a magnetic disk, and an optical disk, for example. The output section 5 records the image data from the signal processing section 4 on the recording medium.

The control unit 6 controls the blocks of the digital camera in accordance with user's operation, for example.

With the digital camera in the above configuration, the image sensor 2 receives light coming from the optical system 1, and outputs image data in accordance with the light.

The image data provided by the image sensor 2 is supplied to the memory 3 for storage therein. The image data stored in the memory 3 is then subjected to signal processing by the signal processing section 4, and the resulting image data is supplied to the output section 5 for output therefrom.

[Exemplary Configuration of Image Sensor 2]

Figure 2:
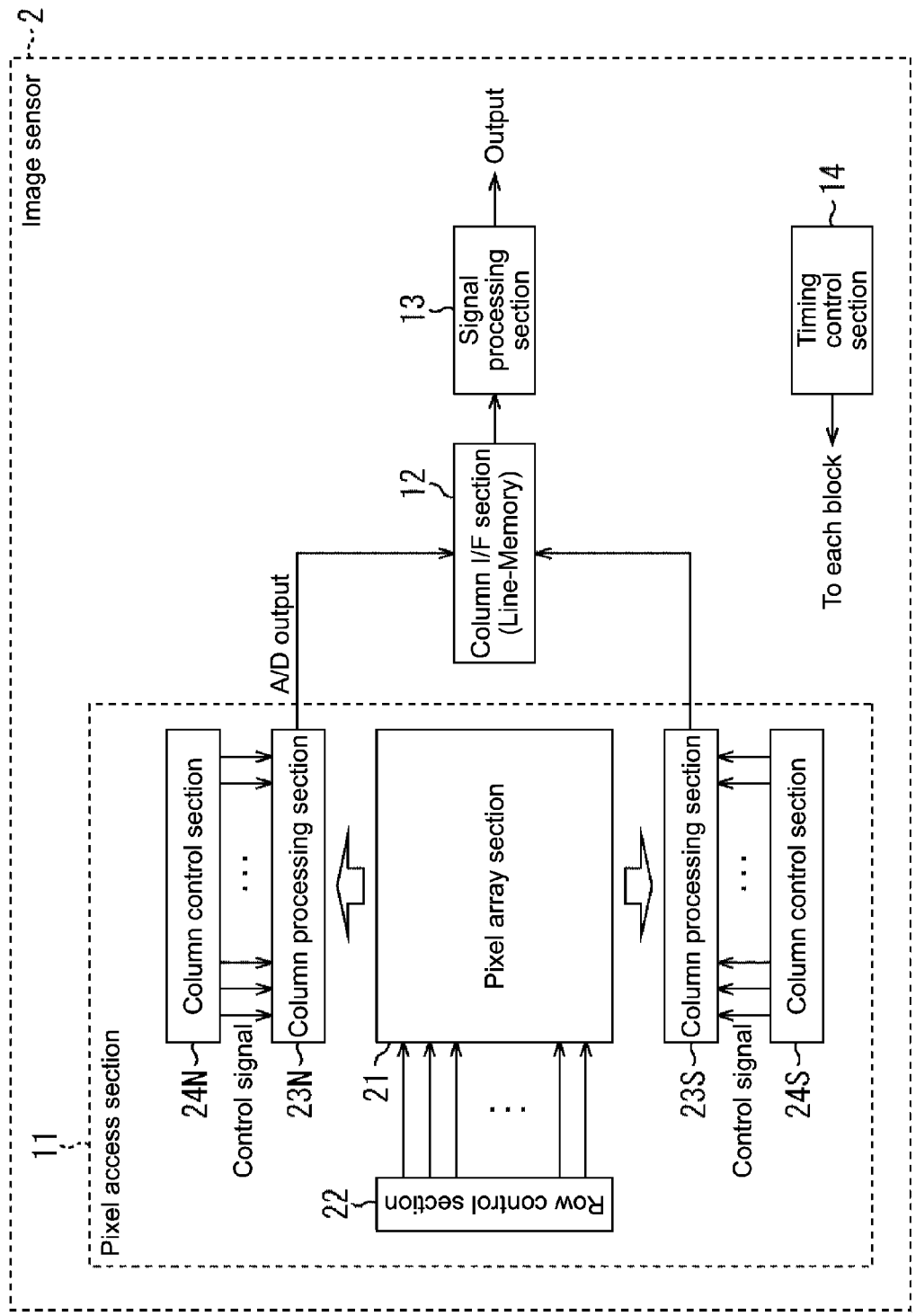
FIG. 2 is a block diagram showing an exemplary configuration of an image sensor of FIG. 1.

FIG. 2 is a block diagram showing an exemplary configuration of the image sensor 2 of FIG. 1.

In FIG. 2, the image sensor 2 includes a pixel access section 11, a column I/F (Interface) section 12, a signal processing section 13, and a timing control section 14.

The pixel access section 11 includes pixels where photoelectric conversion is performed, and accesses the pixels to acquire pixel values that serve as image data. The pixel access section 11 then outputs the pixel values.

That is, the pixel access section 11 includes a pixel array section 21, a row control section 22, column processing sections 23N and 23S, and column control sections 24N and 24S.

The pixel array section 21 includes two or more shared pixel cells that are two-dimensionally arranged in an orderly manner. The shared pixel cells each include a plurality of pixels that output electric signals by photoelectric conversion.

The pixel array section 21 is under the control of the row control section 22, and reads the electric signals from the pixels in the pixel array section 21 for supply to the column processing sections 23N and 23S.

The row control section 22 performs access control for reading of the electric signals from the pixels in the shared pixel cells in the pixel array section 21.

The column processing sections 23N and 23S perform processing of AD conversion or others on the electric signals (voltage) provided by the pixel array section 21. The column processing sections 23N and 23S then supply the resulting digital signals to the column I/F section 12 as pixel values.

The column control section 24N performs column control for supplying (outputting), to the column I/F section 12, the pixel values obtained by the processing by the column processing section 23N.

The column control section 24S performs column control for supplying, to the column I/F section 12, the pixel values obtained by the processing by the column processing section 23S.

The column I/F section 12 has a line memory, and temporarily stores the pixel values from the pixel access section 11 (the column processing sections 23N and 23S thereof), thereby serving as an interface for receiving the pixel values.

The signal processing section 13 uses the pixel values stored in the column I/F section 12 for rearrangement of the pixels, correction of the center of the pixels, and any other expected signal processing. The signal processing section 13 then outputs the results to the outside of the image sensor 2, e.g., to the memory 3 (FIG. 1).

The timing control section 14 generates a timing signal for controlling the blocks in the image sensor 2 when to operate, and supplies the timing signal to any of the blocks for control thereover.

Figure 3:
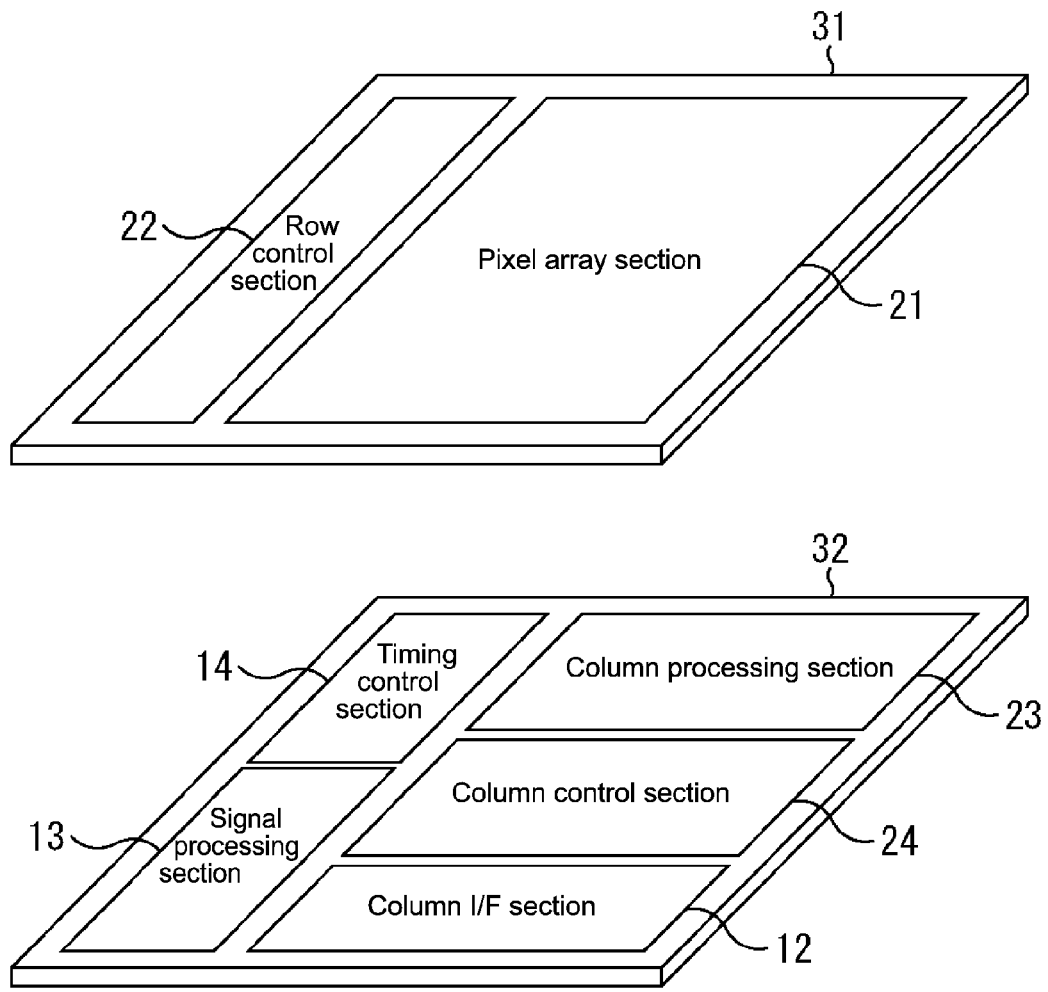
FIG. 3 is a perspective view of the image sensor of FIG. 1, showing an exemplary configuration thereof.

FIG. 3 is a perspective view of the image sensor 2 of FIG. 1, showing an exemplary configuration thereof.

The image sensor 2 may be a bare chip, or two bare chips that are stacked one on the other.

FIG. 3 is a perspective view of the image sensor 2, showing an exemplary general configuration thereof when the sensor is configured by two bare chips stacked one on the other.

In FIG. 3, one of the two bare chips stacked above the other, i.e., upper chip 31, is formed with the pixel array section 21, and the row control section 22.

Also in FIG. 3, the remaining bare chip below the upper chip 31, i.e., lower chip 32, is formed with the column I/F section 12, the signal processing section 13, the timing control section 14, a column processing section 23 including the column processing sections 23N and 23S, and a column control section 24 including the column control sections 24N and 24S.

The image sensor 2 may be configured as a stacked image sensor with the upper and lower chips 31 and 32 stacked one on the other as above.

[Exemplary Detailed Configuration of Pixel Access Section 11]

Figure 4:
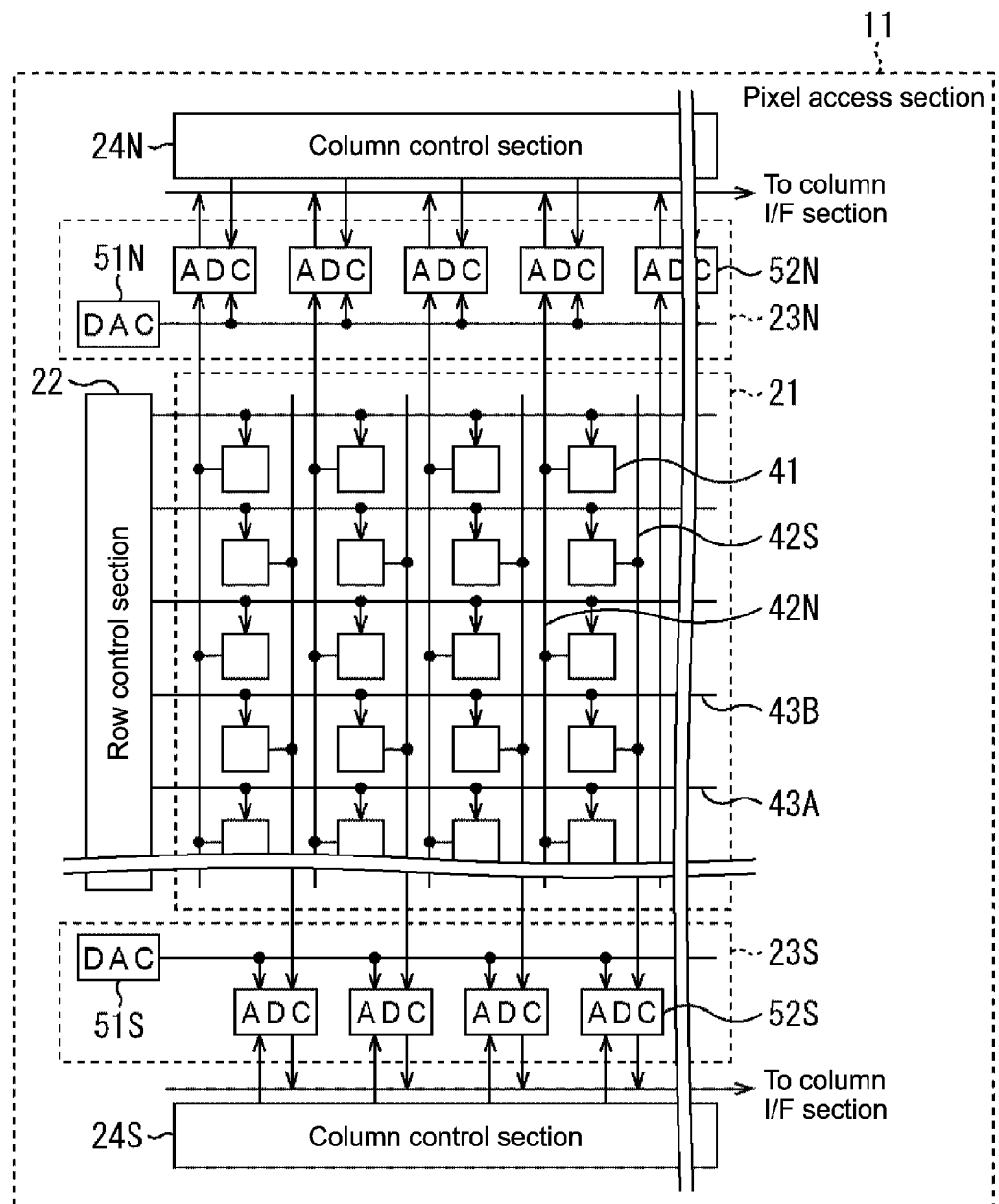
FIG. 4 is a block diagram showing an exemplary detailed configuration of a pixel access section of FIG. 2.

FIG. 4 is a block diagram showing an exemplary detailed configuration of the pixel access section 11 of FIG. 2.

As described by referring to FIG. 2, the pixel access section 11 includes the pixel array section 21, the row control section 22, the column processing sections 23N and 23S, and the column control sections 24N and 24S.

The pixel array section 21 includes two or more shared pixel cells 41 that are two-dimensionally arranged in an orderly manner.

The shared pixel cells 41 each include a plurality of pixels that output electric signals by photoelectric conversion. The details will be described later.

In the pixel array section 21 of FIG. 4, the shared pixel cells 41 are arranged in a matrix. Alternatively, the shared pixel cells 41 may be so arranged that those on the even-numbered rows are horizontally shifted by a one-half of the distance therebetween against those on the odd-numbered rows.

In the pixel array section 21, for each column for the shared pixel cells 41, a plurality of, e.g., two, column signal lines 42N and 42S are provided in the column direction (vertical direction).

In FIG. 4, the column signal line 42N is disposed on the left side of each column for the shared pixel cells 41, and is connected to the shared pixel cells 41 on the odd-numbered rows in the column. The column signal line 42S is disposed on the right side of each column for the shared pixel cells 41, and is connected to the shared pixel cells 41 on the even-numbered rows in the column.

On the upper end side of the column signal lines 42N and 42S, the column processing section 23N is provided, and on the lower end side thereof, the column processing section 23S is provided.

The column signal lines 42N are connected to the column processing section 23N on the upper side (North side), and the column signal lines 42S are connected to the column processing section 23S on the lower side (South side).

Accordingly, in FIG. 4, the electric signals read from the shared pixel cells 41 on the odd-numbered rows are supplied to the column processing section 23N via the column signal lines 42N. Moreover, the electric signals read from the shared pixel cells 41 on the even-numbered rows are supplied to the column processing section 23S via the column signal lines 42S.

As described above, the column signal lines 42N connected to the shared pixel cells 41 on the odd-numbered rows are connected to the column processing section 23N, and the column signal lines 42S connected to the shared pixel cells 41 on the even-numbered rows are connected to the column processing section 23S. Accordingly, in the pixel access section 11, electric signals may be read for processing at the same time from the shared pixel cells 41 on an odd-numbered row RN and from the shared pixel cells 41 on a subsequent even-numbered row RS.

That is, the electric signals read from the shared pixel cells 41 on the odd-numbered row RN may be supplied to the column processing section 23N via the column signal lines 42N for processing.

Moreover, the electric signals read from the shared pixel cells 41 on the even-numbered row RS subsequent to the odd-numbered row RN may be supplied to the column processing section 23S via the column signal lines 42S for processing.

As described above, the column processing sections 23N and 23S may perform processing on electric signals read at the same time from the shared pixel cells 41 on the two rows, i.e., the odd- and even-numbered rows RN and RS.

In the pixel array section 21, for each row for the shared pixel cells 41, a row signal line 43A or 43B is provided in the row direction (horizontal direction).

The row signal line 43A is provided to each of the odd-numbered rows, and the row control section 22 supplies (directs) control signals to the row signal lines 43A, thereby performing access control over the shared pixel cells 41 on the odd-numbered rows.

The row signal line 43B is provided to each of the even-numbered rows, and the row control section 22 supplies control signals to the row signal lines 43B, thereby performing access control over the shared pixel cells 41 on the even-numbered rows.

The row signal lines 43A and 43B are, so to speak, different systems, so that the row control section 22 may supply different control signals thereto being the different systems.

This allows the row control section 22 to perform access control over the shared pixel cells 41 differently between the two odd- and even-numbered rows RN and RS from which electric signals are read at the same time.

The column processing section 23N includes a DAC (Digital Analog Converter) 51N, and ADCs (Analog Digital Converters) 52N as many as the number of columns for the shared pixel cells 41 in the pixel array section 21.

The DAC 51N performs DA conversion so as to generate an analog reference signal for supply to the ADCs 52N. This analog reference signal shows a period of level change from a given initial value to a given last value with a fixed slope as a ramp signal, for example.

Assuming that the number of columns for the shared pixel cells 41 is X, among the X ADCs 52N, the x-th (x=1, 2, . . . , X) ADC 52N is connected to the x-th column signal line 42N. In this configuration, the x-th ADC 52N is provided with electric signals read from the shared pixel cells 41 on the x-th column via the x-th column signal line 42N.

As to the electric signals read from the shared pixel cells 41 on the x-th column via the x-th column signal line 42N, the x-th ADC 52N makes a comparison with the reference signal coming from the DAC 51N. The x-th ADC 52N then counts the time until the reference signal is changed in level, i.e., until the level of the reference signal matches the level of the electric signals, thereby performing AD conversion or others on the electric signals.

The ADC 52N then outputs the results of the AD conversion or others, i.e., pixel values being digital electric signals, to the column I/F section 12 (FIG. 2) in accordance with the control of the column control section 24N.

The column processing section 23S includes a DAC 51S, and X ADCs 52S, i.e., ADCs 52S as many as the X columns for the shared pixel cells 41 in the pixel array section 21.

The DAC 51S generates a reference signal similarly to the DAC 51N, and supplies the reference signal to the ADCs 52S.

Among the X ADCs 52S, the x-th ADC 52S is connected to the x-th column signal line 42S. In this configuration, the x-th ADC 52S is provided with electric signals read from the shared pixel cells 41 on the x-th column via the x-th column signal line 42S.

Similarly to the ADCs 52N, using the reference signal coming from the DAC 51N, the x-th ADC 52S performs AD conversion or others on the electric signals coming from the shared pixel cells 41 on the x-th column via the x-th column signal line 42N.

The ADC 52S then outputs the results of the AD conversion or others, i.e., pixel values being digital electric signals, to the column I/F section 12 (FIG. 2) in accordance with the control of the column control section 24S.

Note that a piece of DAC may serve as the DACs 51N and 51S.

[Exemplary Configuration of Shared Pixel Cell 41]

Figure 5:
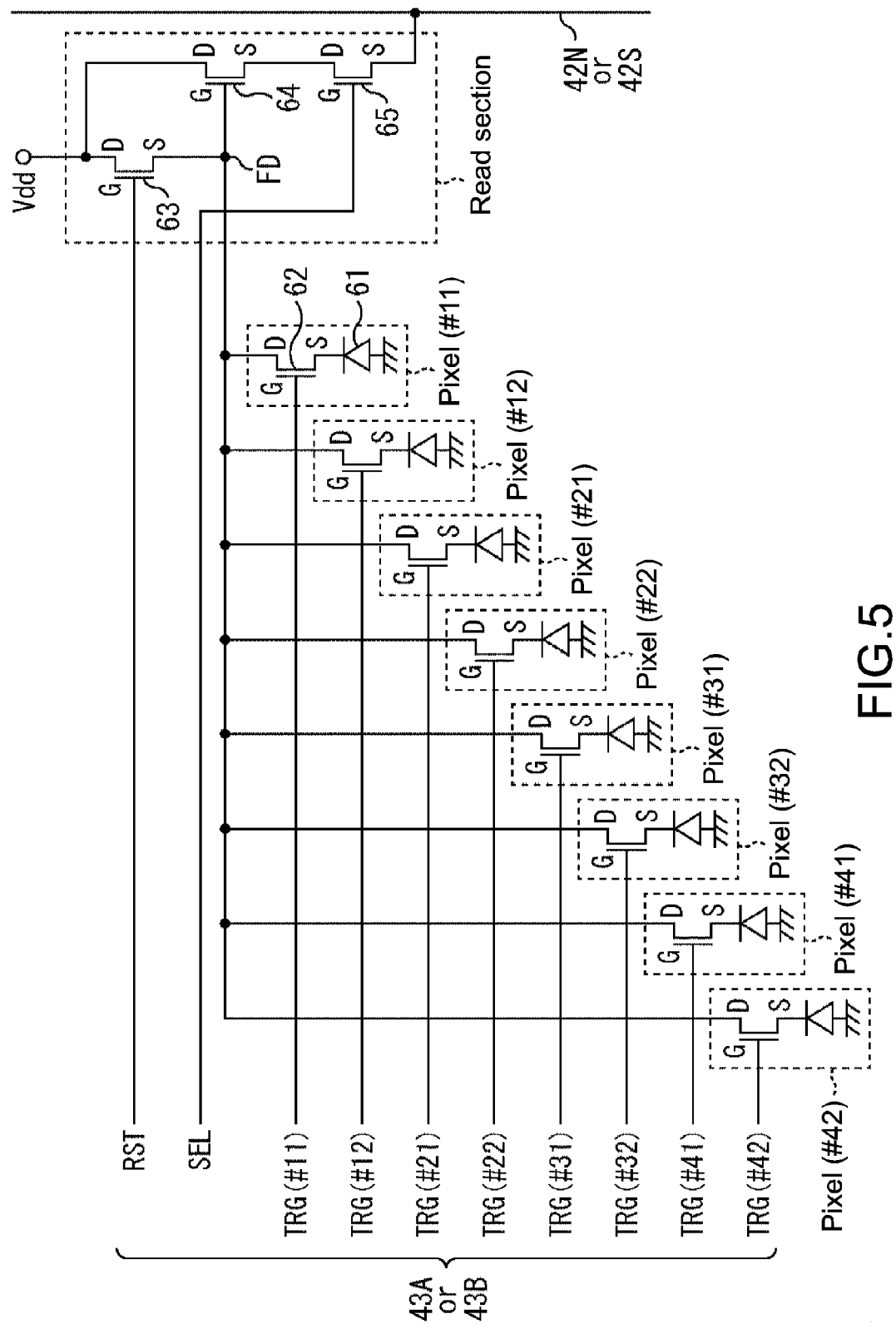
FIG. 5 is a circuit diagram showing an exemplary configuration of a shared pixel cell.

FIG. 5 is a circuit diagram showing an exemplary configuration of the shared pixel cell 41.

The shared pixel cell 41 of FIG. 5 includes a plurality of pixels, e.g., eight pixels, and FETs (Field Effect Transistors) 63, 64, and 65.

Each of the pixels includes a PD (Photo Diode) 61 and an FET 62, and outputs an electric signal by photoelectric conversion.

The PD 61 is an exemplary photoelectric conversion element. The PD 61 receives incoming light, and stores a charge corresponding to the light, thereby performing photoelectric conversion.

The anode of the PD 61 is connected to the ground (grounded), and the cathode of the PD 61 is connected to the source of the FET 62.

The FET 62 is a transistor (Tr) for transferring the charge stored in the PD 61 to the FD, and is hereinafter sometimes referred to as transfer Tr 62.

The source of the transfer Tr 62 is connected to the cathode of the PD 61, and the drain thereof is connected to the gate of the FET 64 via the FD.

The gate of the transfer Tr 62 is connected to the row control line 43A or 43B, and the date thereof is provided with transfer pulses TRG (#11, #12, #21, #22, #31, #32, #41, and #42) via the row control line 43A or 43B.

The row control section 22 (FIG. 4) supplies a control signal to the row control line 43A or 43B for driving (access-controlling) the shared pixel cell 41 via the row control line 43A or 43B. The control signal includes, other than the transfer pulses TRG, a reset pulse RST and a selection pulse SEL that will be described later.

The FD is a region formed at the connecting point between the source of the FET 63 and the gate of the FET 64. In the FD, the charge provided thereto is converted into voltage like a capacitor.

For simplicity, FIG. 5 shows the shared pixel cell 41 in which the eight pixels share a piece of FD. Alternatively, the shared pixel cell 41 may include two FDs, and one of the two FDs may be shared by the four pixels, and the other FD may be shared by the remaining four pixels.

The FET 63 is a transistor for resetting the charge (voltage (potential)) stored in the FD, and is hereinafter sometimes referred to as reset Tr 63.

The drain of the reset Tr 63 is connected to a power supply Vdd, and the source thereof is connected to the FD.

The gate of the reset Tr 63 is connected to the row control line 43A or 43B, and the gate thereof is provided with the reset pulse RST via the row control line 43A or 43B.

The FET 64 is a transistor for amplifying the voltage of the FD, and is hereinafter sometimes referred to as amplifier Tr 64.

The gate of the amplifier Tr 64 is connected to the FD, and the drain thereof is connected to the power supply Vdd. The source of the amplifier Tr 64 is connected to the drain of the FET 65.

The FET 65 is for selecting either the column signal line 42N or 42S to provide an output of electric signals (voltage), and is hereinafter sometimes referred to as selection Tr 65.

The source of the selection Tr 65 is connected to the column signal line 42N or 42S.

The gate of the selection Tr 65 is connected to the column control line 43A or 43B, and the gate thereof is provided with the selection pulse SEL via the column control line 43A or 43B.

Herein, the column signal line 42N or 42S connected to the source of the selection Tr 65 is connected with a current source that is not shown. This current source configures the circuit in an SF (Source Follower) with the amplifier Tr 64 and the selection Tr 65. The FD is thus connected to the column signal line 42N or 42S via the circuit in the SF.

The shared pixel cell 41 may be configured without the selection Tr 65.

In the configuration of FIG. 5, if the number of pixels is reduced from eight to one, the configuration is referred to as unit pixel.

In the shared pixel cell 41 in the above configuration, the PD 61 receives incoming light and performs photoelectric conversion, thereby storing the charge corresponding to the amount of received light. Herein, for simplicity, the selection pulse SEL is assumed to be in the H level, and the selection Tr 65 is assumed to be in the ON state.

After a predetermined period of time (exposure time) since the storage of charge by the PD 61, the row control section 22 (FIG. 4) temporality changes the level of the transfer pulses TRG from L (Low) to H (High).

With the transfer pulses TRG temporarily changed in level to H, the transfer Tr 62 is temporarily turned ON.

With the transfer Tr 62 being turned ON, the charge stored in the PD 61 is transferred to the FD via the transfer Tr 62 for storage therein.

Before temporarily changing the level of the transfer pulses TRG to H, the row control section 22 temporarily sets the reset pulse RST to H level, thereby temporarily turning ON the reset Tr 63.

With the reset Tr 63 being turned ON, the FD is connected to the power supply Vdd via the reset Tr 63, and the charge in the FD is reset by being discharged to the power supply Vdd via the reset Tr 63.

Herein, resetting of the charge in the FD through connection to the power supply Vdd as above is sometimes referred to as resetting of the shared pixel cell 41.

After resetting of the charge in the FD, the row control section 22 temporarily changes the level of the transfer pulses TRG to H as described above so that the transfer Tr 62 is temporarily turned ON.

With the transfer Tr 62 being turned ON, the charge stored in the PD 61 is transferred to the charge-reset FD via the transfer Tr 62 for storage therein.

The voltage (potential) corresponding to the charge stored in the FD is then output onto the column signal line 42N or 42S as a signal-line voltage (electric signal) via the amplifier Tr 64 and the selection Tr 65.

In the ADC 52N or 52S (FIG. 4) connected to the column signal line 42N or 42S, the reset level being the signal-line voltage immediately after the resetting of the shared pixel cell 41 is subjected to AD conversion.

Also in the ADC 52N or 52S, the signal level being the signal-line voltage after the transfer Tr 62 being temporarily turned ON is subjected to AD conversion. Herein, the signal-line voltage corresponds to the charge stored in the PD 61 and transferred to the FD, and the signal level includes the reset level and the level serving as a pixel value.

Thereafter, in the ADC 52N or 52S, CDS (Correlated Double Sampling) is performed to find, as a pixel value, a difference of AD conversion results between the reset level and the signal level. After the CDS, the resulting electric signal is output to the column I/F section 12 (FIG. 2) as a pixel value.

In the above-mentioned manner, a pixel value is read from a piece of pixel in the shared pixel cell 41.

The row control section 22 reads a pixel value one by one from the eight pixels by turning ON the transfer Trs 62 therein one by one, for example.

In the below, for simplicity, CDS is not taken into consideration for reading of a pixel signal being an electric signal from the shared pixel cell 41 (from the pixels therein) for use as a pixel value.

In FIG. 5, a read section for reading a pixel signal from a pixel is configured by the reset Tr 63, the amplifier Tr 64, the selection Tr 65, and the FD.

In the shared pixel cell 41 of FIG. 5, the read section is shared by the eight pixels. The number of pixels in the shared pixel cell 41 is not restrictive to eight, and may be arbitrary, e.g., two or four.

Figure 6:
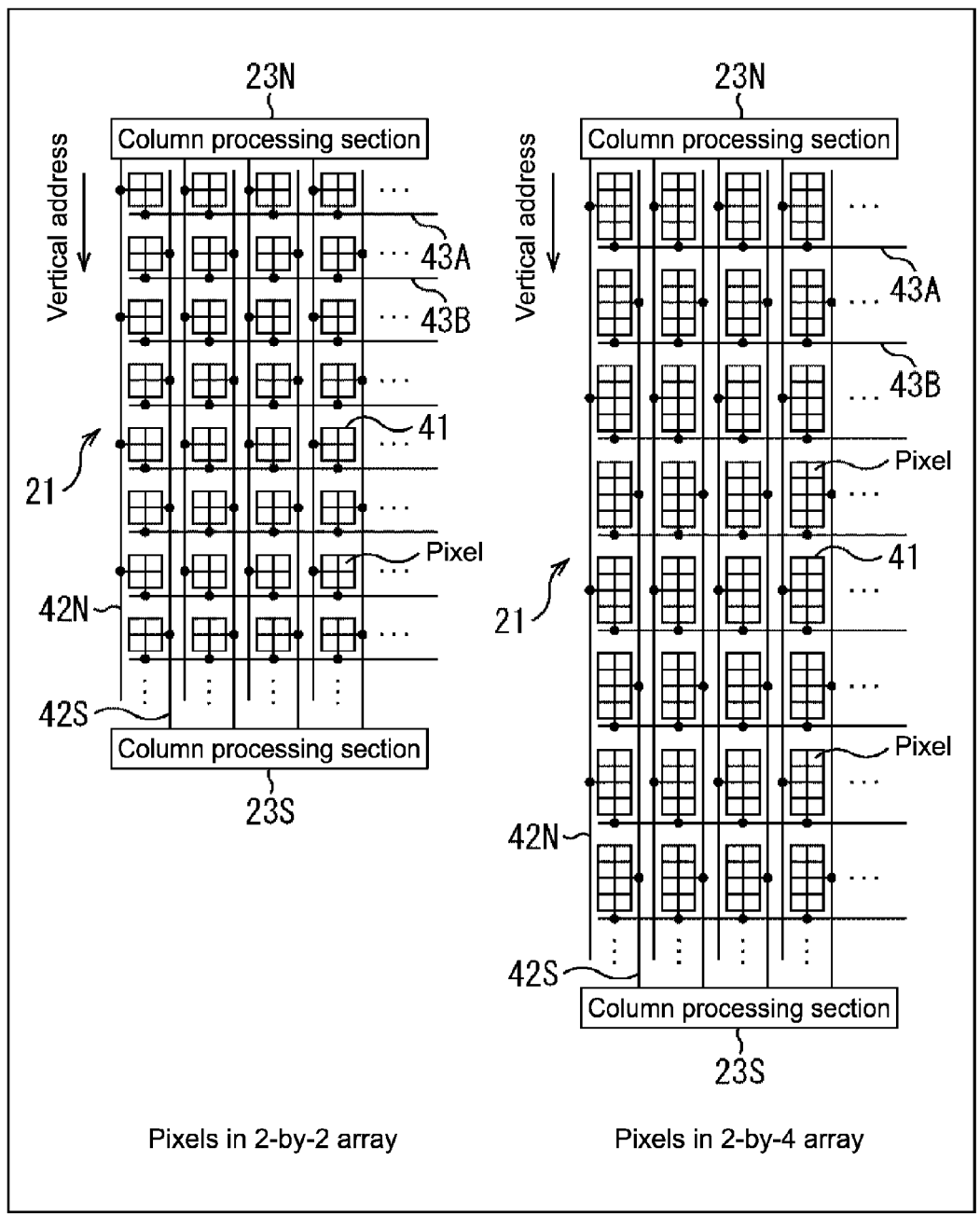
FIG. 6 is a diagram showing an exemplary pixel layout in the shared pixel cell.

FIG. 6 is a diagram showing an exemplary pixel layout in the shared pixel cell 41.

The left part of FIG. 6 is a diagram showing an exemplary pixel layout in the shared pixel cell 41 including four pixels.

When the shared pixel cell 41 includes four pixels, as exemplarily shown in the left part of FIG. 6, the four pixels may be arranged in a 2-by-2 array, i.e., two in the horizontal (row) direction and two in the vertical (column) direction.

The right part of FIG. 6 is a diagram showing an exemplary pixel layout in the shared pixel cell 41 including eight pixels.

When the shared pixel cell 41 includes eight pixels, as exemplarily shown in the right part of FIG. 6, the eight pixels may be arranged in a 2-by-4 array, i.e., two in the horizontal direction and four in the vertical direction.

[Shared Pixel Cell 41 in 2-by-2 Array]

Figure 7:
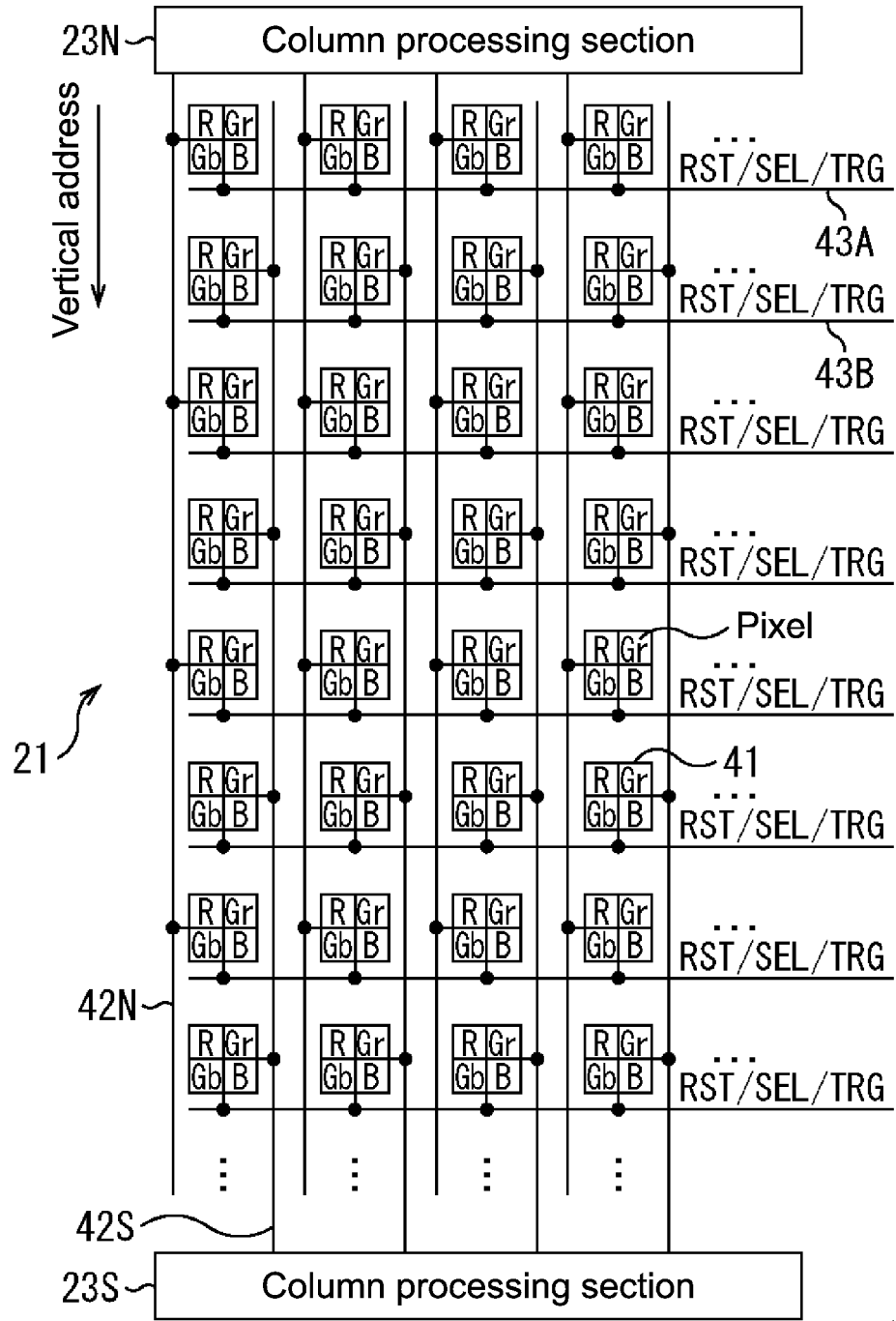
FIG. 7 is a diagram showing an exemplary pixel layout in each 2-by-2 shared pixel cell when the BAYER filter array is adopted thereto.

FIG. 7 is a diagram showing an exemplary pixel layout in the 2-by-2 shared pixel cell 41 (the shared pixel cell 41 including four pixels in the 2-by-2 array) when the BAYER filter array is adopted as a color filter pattern.

In FIG. 7, in the 2-by-2 array in the shared pixel cell 41, the upper-left pixel functions as R pixel receiving R (Red)-component light, and the upper-right pixel functions as Gr pixel receiving G (Green)-component light. The lower-left pixel functions as Gb pixel receiving G-component light, and the lower-right pixel functions as a B pixel receiving B (Blue)-component light.

Figure 8:
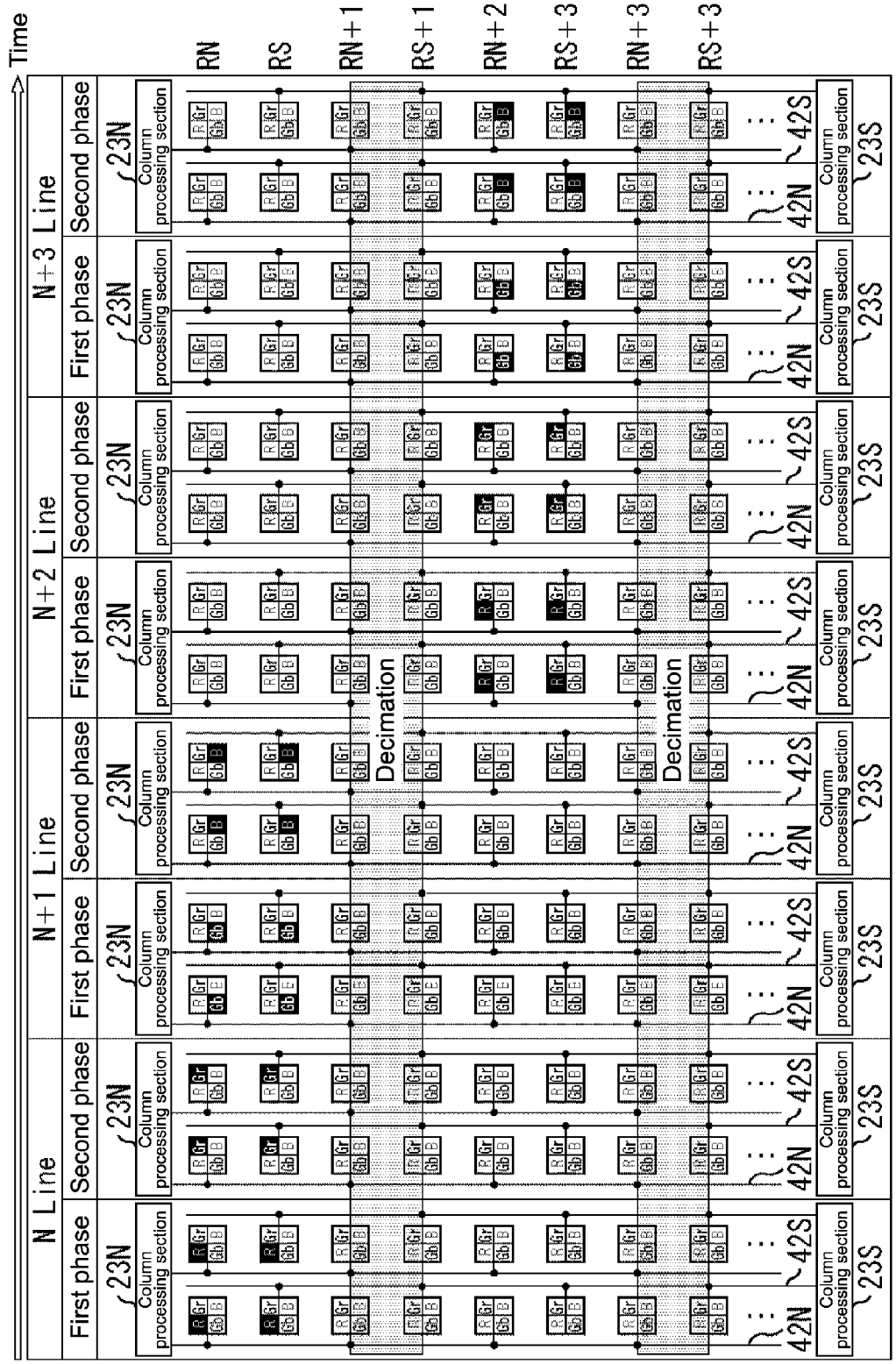
FIG. 8 is a diagram illustrating exemplary pixel signal reading from the 2-by-2 shared pixel cells of FIG. 7.

FIG. 8 is a diagram illustrating exemplary reading of pixel signals from the shared pixel cells 41 that are each in the 2-by-2 array as shown in FIG. 7.

Herein, the alignment of the shared pixel cells 41 on a row is sometimes referred to as shared pixel row, and the alignment of the pixels on a row is sometimes referred to as pixel row.

In this embodiment, the shared pixel cells 41 on a shared pixel row are as many as the X columns for the shared pixel cells 41. When the shared pixel cells 41 are each in the 2-by-2 array, the pixels on a pixel row are as many as twice the X columns for the shared pixel cells 41.

The shared pixel row taking an odd number is sometimes referred to as odd-numbered shared pixel row, and the shared pixel row taking an even number is sometimes referred to as even-numbered shared pixel row.

In the below, the ADCs 52N and 52S (FIG. 4) are all assumed to operate at a speed in which AD conversion is performed twice during the period of a pixel row. The AD conversion performed for the first time by the ADCs 52N and 52S is sometimes referred to as first phase, and the AD conversion for the second time thereby is sometimes referred to as second phase.

FIG. 8 shows how pixel signal reading is performed from the shared pixel cells 41 on the two consecutive columns, and also from the shared pixel cells 41 on the remaining columns, pixel signal reading is similarly performed. In FIG. 8, the horizontal axis indicates the time of each period for a pixel row. These are applicable also to other drawings below.

In FIG. 8, during the first phase in the period of an N-th pixel row (N-th row), as indicated by white-on-black characters, a pixel signal is read from the upper-left R pixel in each of the shared pixel cells 41 on the odd-numbered shared pixel row RN. The pixel signals are then supplied to the column processing section 23N (to the ADCs 52N thereof) via the column signal lines 42N for AD conversion.

Also during the first phase in the period of the N-th pixel row, a pixel signal is read from the upper-left R pixel in each of the shared pixel cells 41 on the shared pixel row subsequent to the odd-numbered shared pixel row RN, i.e., the even-numbered shared pixel row RS. The pixel signals are then supplied to the column processing section 23S (to the ADCs 52S thereof) via the column signal lines 42S for AD conversion.

As described above by referring to FIG. 4, in the pixel array section 21, each column for the shared pixel cells 41 is provided with two column signal lines 42N and 42S. This configuration allows pixel signal reading at the same time from the two consecutive shared pixel rows (from each column thereof), i.e., the odd- and even-numbered shared pixel rows RN and RS.

Thereafter, during the second phase in the period of the N-th pixel row, a pixel signal is read from the upper-right Gr pixel in each of the shared pixel cells 41 on the odd-numbered shared pixel row RN. The pixel signals are then supplied to the column processing section 23N via the column signal lines 42N for AD conversion.

Also during the second phase in the period of the N-th pixel row, a pixel signal is read from the upper-right Gr pixel in each of the shared pixel cells 41 on the even-numbered shared pixel row RS. The pixel signals are then supplied to the column processing section 23S via the column signal lines 42N for AD conversion.

During the first phase in the period of a subsequent (N+1)-th pixel row, a pixel signal is read from the lower-left Gb pixel in each of the shared pixel cells 41 on the odd-numbered shared pixel row RN. The pixel signals are then supplied to the column processing section 23N via the column signal lines 42N for AD conversion.

At the same time, a pixel signal is read from the lower-left Gb pixel in each of the shared pixel cells 41 on the even-numbered shared pixel row RS. The pixel signals are then supplied to the column processing section 23S via the column signal lines 42S for AD conversion.

Thereafter, during the second phase in the period of the (N+1)-th pixel row, a pixel signal is read from the lower-right B pixel in each of the shared pixel cells 41 on the odd-numbered shared pixel row RN. The pixel signals are then supplied to the column processing section 23N via the column signal lines 42N for AD conversion.

At the same time, a pixel signal is read from the lower-right B pixel in each of the shared pixel cells 41 on the odd-numbered shared pixel row RS. The pixel signals are then supplied to the column processing section 23S via the column signal lines 42S for AD conversion.

In the above-mentioned manner, in the period of two pixel rows, pixel signal reading is performed from all of the pixels on the two shared pixel rows, which are larger in number than the two pixel rows.

With pixel signal reading successively from the shared pixel cells 41 on the remaining shared pixel rows on a two-shared-pixel-row basis similarly to the two consecutive odd- and even-numbered shared pixel rows RN and RS, the image sensor 2 performs normal imaging with which pixel signal reading is performed at a predetermined frame rate from every pixel in all of the shared pixel cells 41.

The image sensor 2 is capable of high-speed imaging at a frame rate higher than the predetermined frame rate if pixel signal reading (pixel signal supply to the column processing sections 23N and 23S) is performed with the reduced number of pixel rows.

For reducing the number of pixel rows, the pixel rows may be partially skipped (no pixel signal is read therefrom) during pixel signal reading.

In FIG. 8, the pixel rows are reduced to a half, i.e., ½ decimation, by skipping of four pixel rows (two shared pixel rows) out of eight pixel rows (four shared pixel rows), i.e., ½ reading skipping.

That is, in FIG. 8, pixel signal reading is performed from each of the shared pixel cells 41 (from four pixels therein) on the two consecutive odd- and even-numbered shared pixel rows RN and RS. Thereafter, their subsequent two consecutive odd- and even-numbered shared pixel rows RN+1 and RS+1 are skipped for pixel signal reading from each of the shared pixel cells 41 (from the four pixels therein) thereon.

Next, pixel signal reading is performed from the shared pixel cells 41 on the subsequent two consecutive odd- and even-numbered shared pixel rows RN+2 and RS+2, and their subsequent two consecutive odd- and even-numbered shared pixel rows RN+3 and RS+3 are skipped for pixel signal reading from the shared pixel cells 41 thereon.

With pixel signal reading from the remaining shared pixel rows similarly to the above, ½ decimation is done.

Such pixel signal reading with ½ decimation leads to high-speed imaging at a frame rate twice the frame rate for normal imaging.

Figure 9:
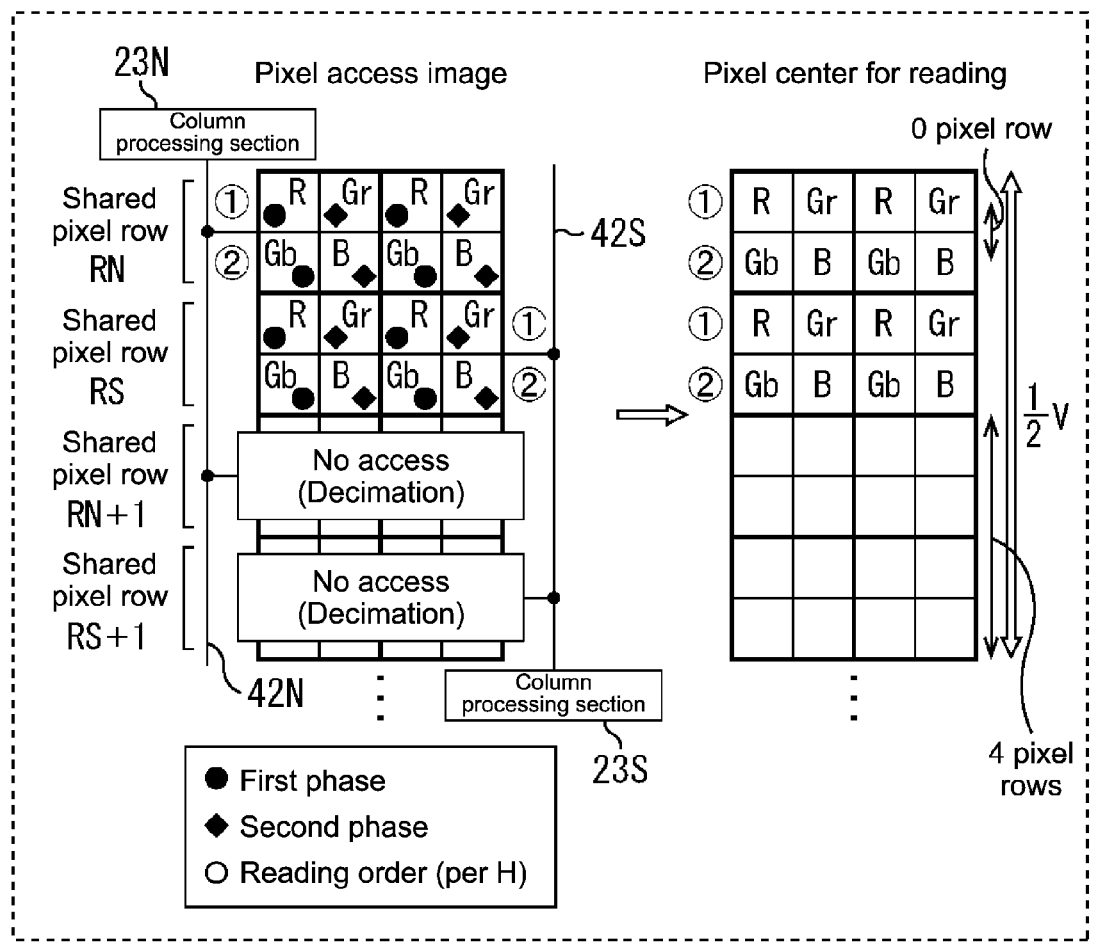
FIG. 9 is a diagram showing the center of pixels with values, which are the results of pixel signal reading with ½ decimation of FIG. 8.

FIG. 9 is a diagram showing the center of pixels with values (position of pixels with values), which are the results of pixel signal reading with ½ decimation of FIG. 8.

At the time of pixel signal reading with ½ decimation of FIG. 8, such a process as described above is repeated, i.e., pixel signal reading is performed from the shared pixel cells 41 on the two shared pixel rows, and then the subsequent two shared pixel rows are skipped for pixel signal reading from the shared pixel cells 41 thereon.

In this case, after pixel signal reading from a pixel at a certain position pos in the shared pixel cell 41, the resulting pixel value is of the pixel at the position pos being the pixel center. In the resulting frame image, the number of the shared pixel rows is reduced to a half, i.e., the pixels on the two shared pixel rows are with values, and the pixels on the subsequent two shared pixel rows are not with values. That is, in the resulting image, the number of the pixel rows is reduced to a half, i.e., the pixels on the four pixel rows are with values, and the pixels on the subsequent four pixel rows are not with values. That is, compared with the number of pixel rows (V) for pixel signal reading during normal imaging, the number of the pixel rows in the resulting frame image is a half (V/2).

Accordingly, in the image obtained by pixel signal reading with ½ decimation of FIG. 8, the interval between the pixel rows for the pixels with values is not uniform (the vertical interval between the pixels with values) as shown in FIG. 9, i.e., the interval may include no pixel row or four pixel rows. Hereinafter, such an interval is sometimes referred to as pixel-value sampling interval.

When the pixel-value sampling interval largely varies such as no pixel row and four pixel rows as described above, especially if with a high-frequency image, the image quality may suffer from degradation due to moire or false color.

In FIG. 9, circled numbers denote the order of pixel signal reading in the period of a pixel row. The solid-filled circles denote pixels whose pixel signals are subjected to AD conversion during the first phase, and the solid-filled rhombuses denote pixels whose pixel signals are subjected to AD conversion during the second phase. These are applicable also to other drawings below.

With the pixel signal reading with ½ decimation of FIG. 8, for pixel signal reading at the same time from the two consecutive odd- and even-numbered shared pixel rows RN and RS, a target pixel is in the same position in each of the shared pixel cells 41 thereon.

That is, during the first phase in the period of the N-th pixel row, for example, pixel signal reading is performed at the same time from the two consecutive odd- and even-numbered shared pixel rows RN and RS. The target pixels for such pixel signal reading (hereinafter, sometimes referred to as read-target pixels) are the upper-left R pixels in the shared pixel cells 41 on both of the odd- and even-numbered shared pixel rows RN and RS.

As described above, for pixel signal reading at the same time from the two shared pixel rows, when the read-target pixels are those in the same position in the shared pixel cells 41 thereon, pixel signal reading with decimation may result in an image with a largely-varying pixel-value sampling interval as described by referring to FIG. 9.

Herein, because the row signal lines 43A and 43B are different systems as described above by referring to FIG. 4, the row control section 22 may supply different control signals thereto to perform access control over the shared pixel cells 41 differently between the two rows (two shared pixel rows) from which pixel signals (electric signals) are read at the same time, i.e., between the odd-numbered row (odd-numbered shared pixel row) RN and the even-numbered row (even-numbered shared pixel row) RS.

Figure 10:
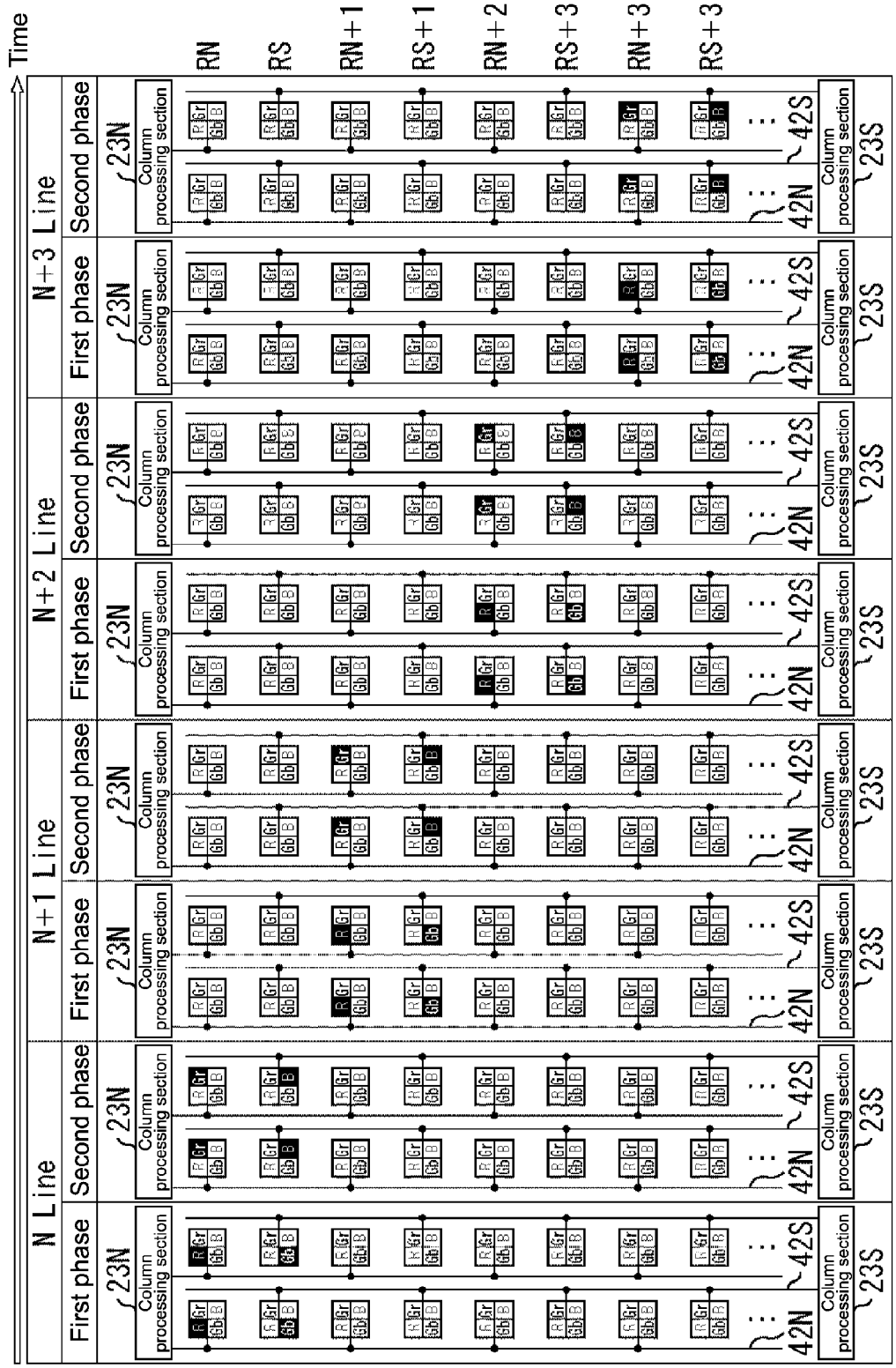
FIG. 10 is a diagram illustrating exemplary pixel signal reading from 2-by-2 shared pixel cells with ½ decimation under individual access control.

Accordingly, for pixel signal reading at the same time from the two shared pixel rows, e.g., the odd-numbered shared pixel row RN and the subsequent even-numbered shared pixel row RS, the row control section 22 may perform access control thereover to read pixel signals from the pixels in different positions in the shared pixel cells 41 thereon. Such access control is hereinafter sometimes referred to as individual access control. FIG. 10 is a diagram illustrating exemplary pixel signal reading from the 2-by-2 shared pixel cells 41 with ½ decimation under individual access control.

With individual access control, pixel signal reading with ½ decimation is performed as below from the 2-by-2 shared pixel cells 41.

That is, in FIG. 10, during the first phase in the period of an N-th pixel row (N-th row), as indicated by white-on-black characters, a pixel signal is read from the upper-left R pixel in each of the shared pixel cells 41 on the odd-numbered shared pixel row RN. The pixel signals are then supplied to the column processing section 23N via the column signal lines 42N for AD conversion.

Also during the first phase in the period of the N-th pixel row, a pixel signal is read not from the upper-left R pixel but from the lower-left Gb pixel in each of the shared pixel cells 41 on the shared pixel row subsequent to the odd-numbered shared pixel row RN, i.e., the even-numbered shared pixel row RS. The pixel signals are then supplied to the column processing section 23S via the column signal lines 42S for AD conversion.

As described above, during the first phase in the period of the N-th pixel row, pixel signal reading is performed at the same time from the two consecutive odd- and even-numbered shared pixel rows RN and RS. Such individual access control allows, as to the shared pixel cells 41 on the odd-numbered shared pixel row RN, pixel signal reading from the upper-left R pixels therein, and as to the shared pixel cells 41 on the even-numbered shared pixel rows RS, pixel signal reading not from the upper-left R pixels but from the lower-left Gb pixels therein.

Thereafter, during the second phase in the period of the N-th pixel row, a pixel signal is read from the upper-right Gr pixel in each of the shared pixel cells 41 on the odd-numbered shared pixel row RN. The pixel signals are then supplied to the column processing section 23N via the column signal lines 42N for AD conversion.

Also during the second phase in the period of the N-th pixel row, a pixel signal is read not from the upper-right Gr pixel but from the lower-right B pixel in each of the shared pixel cells 41 on the even-numbered shared pixel row RS. The pixel signals are then supplied to the column processing section 23S via the column signal lines 42N for AD conversion.

As described above, during the second phase in the period of the N-th pixel row, pixel signal reading is performed at the same time from the two consecutive odd- and even-numbered shared pixel rows RN and RS. Such individual access control allows, as to the shared pixel cells 41 on the odd-numbered shared pixel row RN, pixel signal reading from the upper-right Gr pixels therein, and as to the shared pixel cells 41 on the even-numbered shared pixel rows RS, pixel signal reading not from the upper-right Gr pixels but from the lower-right B pixels therein.

In this example, because a shared pixel row for the 2-by-2 shared pixel cells 41 means two pixel rows, the two consecutive odd- and even-numbered shared pixel rows RN and RS for simultaneous pixel signal reading mean four pixel rows.

In the period of the N-th pixel row, in the above-mentioned manner, pixel signal reading is performed from the read-target pixels being the pixels on the first and fourth (from the top) pixel rows in the four pixel rows being the two shared pixel rows. The pixels on the remaining second and third pixel rows are skipped for pixel signal reading.

During the first phase in the period of the next (N+1)-th pixel row, a pixel signal is read from the upper-left R pixel in each of the shared pixel cells 41 on the shared pixel row subsequent to the even-numbered shared pixel row RS, i.e., the odd-numbered shared pixel row RN+1. The pixel signals are then supplied to the column processing section 23N via the column signal lines 42N for AD conversion.

At the same time, a pixel signal is read from the lower-left Gb pixel in each of the shared pixel cells 41 on the shared pixel row subsequent to the odd-numbered shared pixel row RN+1, i.e., the even-numbered shared pixel row RS+1. The pixel signals are then supplied to the column processing section 23S via the column signal lines 42S for AD conversion.

Thereafter, during the second phase in the period of the (N+1)-th pixel row, a pixel signal is read from the upper-right Gr pixel in each of the shared pixel cells 41 on the odd-numbered shared pixel row RN+1. The pixel signals are then supplied to the column processing section 23N via the column signal lines 42N for AD conversion.

At the same time, a pixel signal is read from the lower-right B pixel in each of the shared pixel cells 41 on the even-numbered shared pixel row RS+1. The pixel signals are then supplied to the column processing section 23S via the column signal lines 42S for AD conversion.

In the above-mentioned manner, during the first phase in the period of the (N+1)-th pixel row, pixel signal reading is performed from the upper-left R pixel in each of the shared pixel cells 41 on the odd-numbered shared pixel row RN+1, and at the same time from the lower-left Gb pixel in each of the shared pixel cells 41 on the even-numbered shared pixel row RS+1.

Thereafter, during the second phase in the period of the (N+1)-th pixel row, a pixel signal is read from the upper-right Gr pixel in each of the shared pixel cells 41 on the odd-numbered shared pixel row RN+1, and at the same time from the lower-right B pixel in each of the shared pixel cells 41 on the even-numbered shared pixel row RS+1.

That is, similarly to the case of the N-th pixel row, in the period of the (N+1)-th pixel row, pixel signal reading is performed from the read-target pixels being the pixels on the first and fourth pixel rows in the four pixel rows being the two shared pixel rows. The pixels on the remaining second and third pixel rows are skipped for pixel signal reading.

Repeating such a procedure of pixel signal reading and ½ reading skipping leads to pixel signal reading with ½ decimation, i.e., pixel signal reading from the pixels on the first and fourth pixel rows in the four pixel rows being the two shared pixel rows, and ½ reading skipping of skipping the pixels on the remaining second and third pixel rows for pixel signal reading. This accordingly leads to high-speed imaging at a frame rate twice the frame rate for normal imaging.

Figure 11:
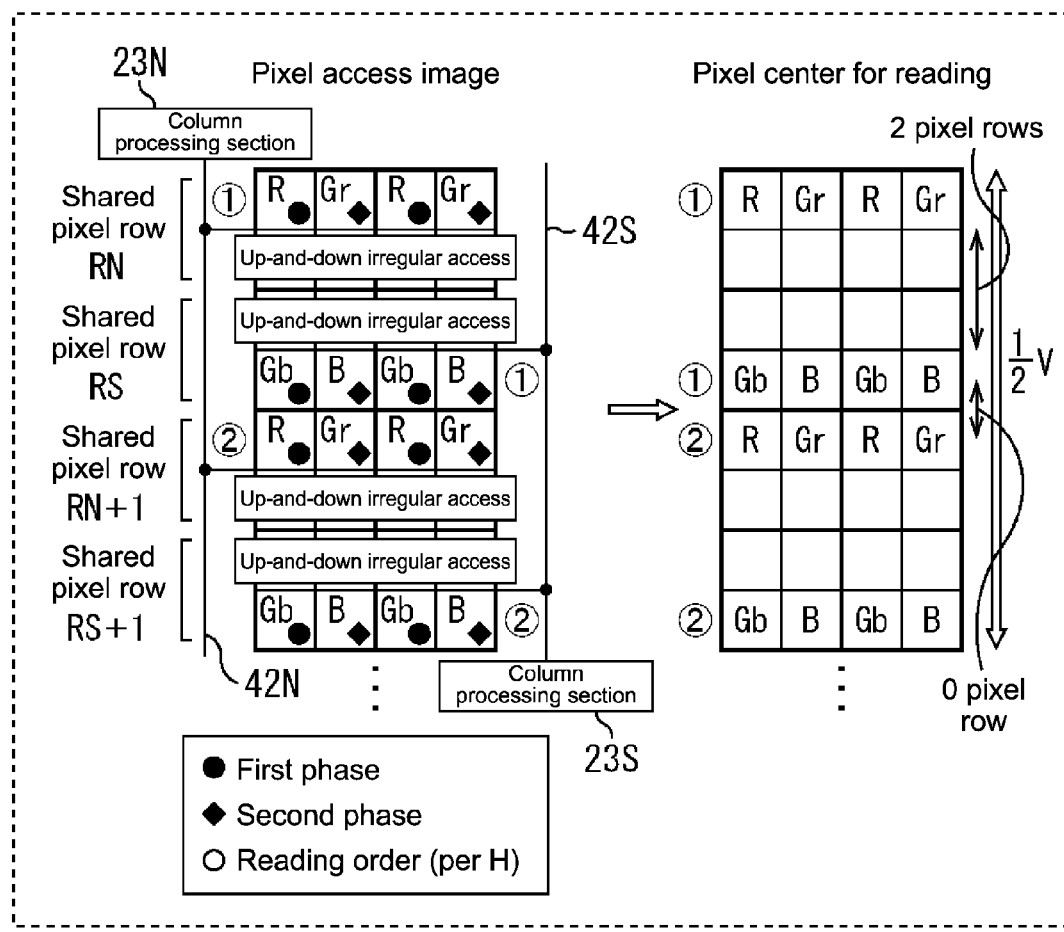
FIG. 11 is a diagram showing the center of pixels with values, which are the results of pixel signal reading with ½ decimation of FIG. 10.

FIG. 11 is a diagram showing the center of pixels with values, which are the results of pixel signal reading with ½ decimation of FIG. 10.

With pixel signal reading with ½ decimation of FIG. 10, as described above, a procedure of pixel signal reading and ½ reading skipping is repeated, i.e., pixel signal reading from pixels on the first and fourth pixel rows in the four pixel rows being the two shared pixel rows, and ½ reading skipping of skipping the pixels on the remaining second and third pixel rows for pixel signal reading.

In this case, after pixel signal reading from a pixel at a certain position pos in the shared pixel cell 41, the resulting pixel value is of the pixel at the position pos being the pixel center. In the resulting frame image, the number of the pixel rows is reduced to a half, i.e., the pixels are with values on the first and fourth pixel rows in the four pixel rows being the two shared pixel rows, and the pixels are not with values on the subsequent four pixel rows.

In the image obtained by pixel signal reading with ½ decimation of FIG. 10, the pixel-value sampling interval (the interval between the pixel rows for the pixels with values) may vary as shown in FIG. 11, i.e., the interval may include no pixel row or two pixel rows. Compared with the case of FIG. 9, the pixel value interval is (more) uniform.

This thus prevents degradation of the image quality to be caused by moire or false color better than in the case of FIG. 9.

As such, for pixel signal reading at the same time from the shared pixel cells 41 on the two shared pixel rows in the image sensor 2 adopting the shared pixel technology, when the row control section 22 performs individual access control for pixel signal reading from the pixels in different positions in the shared pixel cells 41 thereon, high-speed imaging is achieved with control over degradation of the image quality compared with the case of no such individual access control, i.e., in the case that the row control section 22 performs access control of performing pixel signal reading from the pixels in the same position in the shared pixel cells 41 thereon (hereinafter, such access control is sometimes referred to as consistent access control).

[Shared Pixel Cell 41 in 2-by-4 Array]

Figure 12:
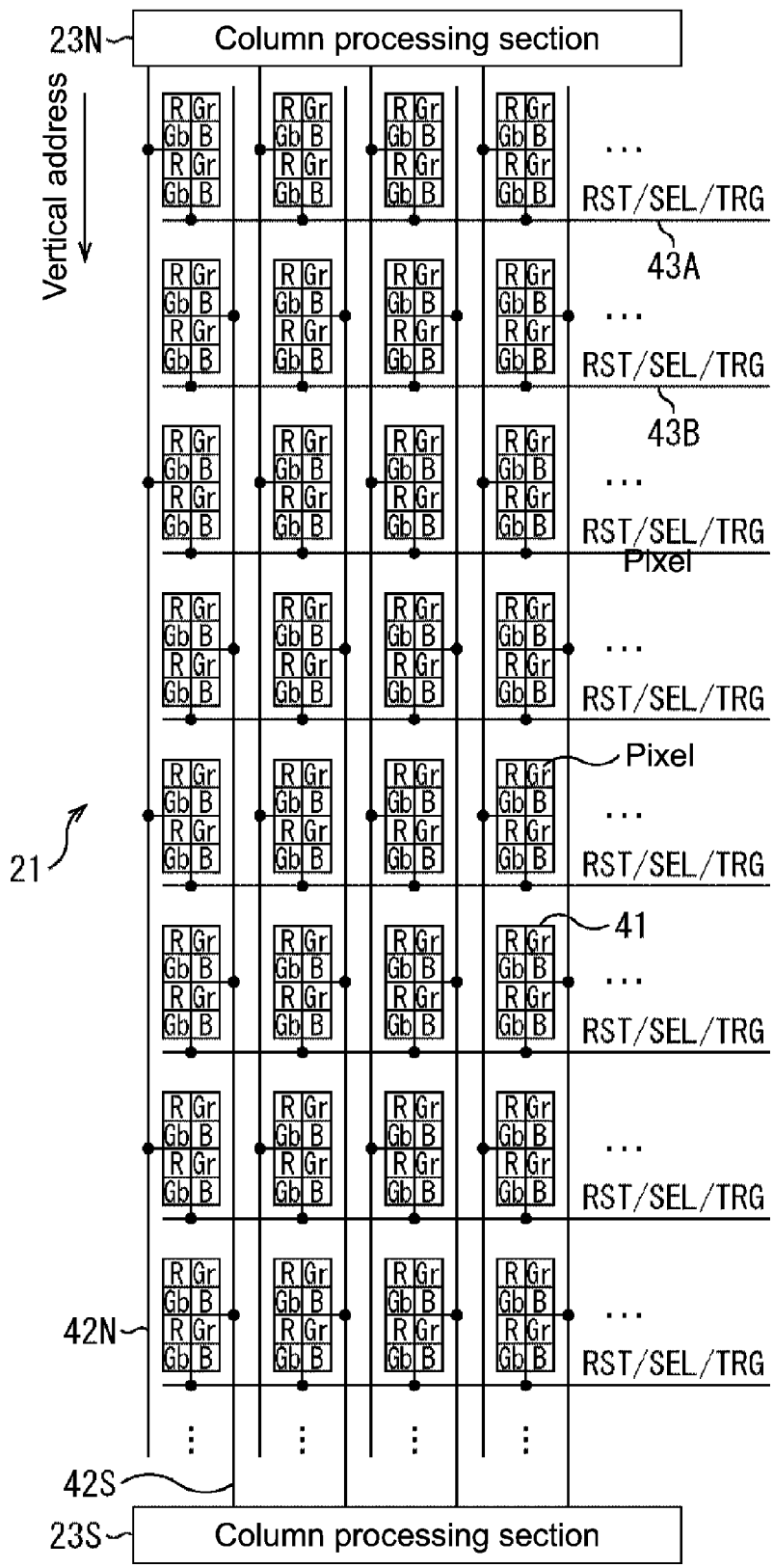
FIG. 12 is a diagram showing an exemplary pixel layout in each 2-by-4 shared pixel cell when the BAYER filter array is adopted thereto.

FIG. 12 is a diagram showing an exemplary pixel layout in the 2-by-4 shared pixel cell 41 (the shared pixel cell 41 including eight pixels in the 2-by-4 array) when the BAYER filter array is adopted thereto as a color filter pattern.

In the shared pixel cell 41 in the 2-by-4 array, the pixel on the i-th from the top and j-th from the left is represented by (i, j), and the pixel at (i, j) is represented as the pixel #(i, j).

In FIG. 12, the pixels #(1, 1) and #(3, 1) in the 2-by-4 shared pixel cell 41 function as R pixels that receive R-component light, and the pixels #(1, 2) and #(3, 2) therein function as Gr pixels that receive G-component light. The pixels #(2, 1) and #(4, 1) therein function as Gb pixels that receive G-component light, and the pixels #(2, 2) and #(4, 4) therein function as B pixels that receive B-component light.

Figure 13:
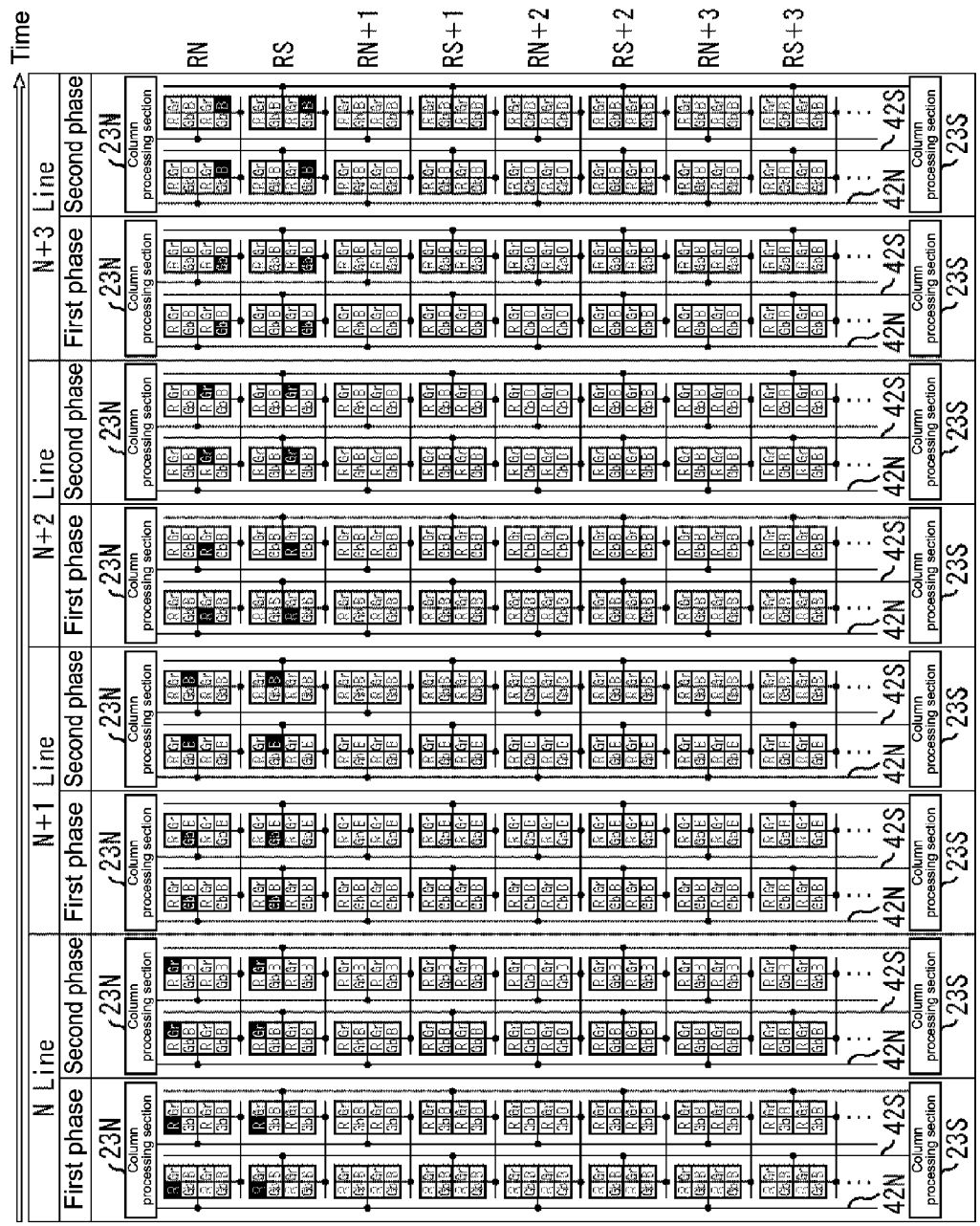
FIG. 13 is a diagram illustrating exemplary pixel signal reading from the 2-by-4 shared pixel cells of FIG. 12 with no decimation.

FIG. 13 is a diagram illustrating exemplary pixel signal reading from the 2-by-4 shared pixel cells 41 of FIG. 12 with no decimation.

In the embodiment, as to the 2-by-4 shared pixel cells 41, the number of pixels on a pixel row is equal to twice the number of columns for the shared pixel cells 41, i.e., X, similarly to the 2-by-2 shared pixel cells 41.

For pixel signal reading with no decimation, the row control section 22 does not perform individual access control but perform consistent access control, e.g., pixel signal reading is performed from the pixels in the same position in the shared pixel cells 41 on the two shared pixel rows.

That is, in FIG. 13, during the first phase in the period of an N-th pixel row (N-th row), as indicated by white-on-black characters, a pixel signal is read from the R pixel at (1, 1) in each of the shared pixel cells 41 on the odd-numbered shared pixel row RN. The pixel signals are then supplied to the column processing section 23N via the column signal lines 42N for AD conversion.

Also during the first phase in the period of the N-th pixel row, a pixel signal is read from the R pixel at (1, 1) in each of the shared pixel cells 41 on the shared pixel row subsequent to the odd-numbered shared pixel row RN, i.e., the even-numbered shared pixel row RS. The pixel signals are then supplied to the column processing section 23S via the column signal lines 42S for AD conversion.

In the above-mentioned manner, pixel signal reading is performed at the same time from the R pixels at (1, 1) in the shared pixel cells 41 on the two consecutive odd- and even-numbered shared pixel rows RN and RS.

Thereafter, during the second phase in the period of the N-th pixel row, a pixel signal is read from the Gr pixel at (1, 2) in each of the shared pixel cells 41 on the odd-numbered shared pixel row RN. The pixel signals are then supplied to the column processing section 23N via the column signal lines 42N for AD conversion.

Also during the second phase in the period of the N-th pixel row, a pixel signal is read from the Gr pixel at (1, 2) in each of the shared pixel cells 41 on the even-numbered shared pixel row RS. The pixel signals are then supplied to the column processing section 23S via the column signal lines 42S for AD conversion.

During the first phase in the period of the next (N+1)-th pixel row, a pixel signal is read from the Gb pixel at (2, 1) in each of the shared pixel cells 41 on the odd-numbered shared pixel row RN. The pixel signals are then supplied to the column processing section 23N via the column signal lines 42N for AD conversion.

At the same time, a pixel signal is read from the Gb pixel at (2, 1) in each of the shared pixel cells 41 on the even-numbered shared pixel row RS. The pixel signals are then supplied to the column processing section 23S via the column signal lines 42S for AD conversion.

Thereafter, during the second phase in the period of the (N+1)-th pixel row, a pixel signal is read from the B pixel at (2, 2) in each of the shared pixel cells 41 on the odd-numbered shared pixel row RN. The pixel signals are then supplied to the column processing section 23N via the column signal lines 42N for AD conversion.

At the same time, a pixel signal is read from the B pixel at (2, 2) in each of the shared pixel cells 41 on the even-numbered shared pixel row RS. The pixel signals are then supplied to the column processing section 23S via the column signal lines 42S for AD conversion.

During the first phase in the period of the next (N+2)-th pixel row, a pixel signal is read from the R pixel at (3, 1) in each of the shared pixel cells 41 on the odd-numbered shared pixel row RN. The pixel signals are then supplied to the column processing section 23N via the column signal lines 42N for AD conversion.

At the same time, a pixel signal is read from the R pixel at (3, 1) in each of the shared pixel cells 41 on the even-numbered shared pixel row RS. The pixel signals are then supplied to the column processing section 23S via the column signal lines 42S for AD conversion.

Thereafter, during the second phase in the period of the (N+2)-th pixel row, a pixel signal is read from the Gr pixel at (3, 2) in each of the shared pixel cells 41 on the odd-numbered shared pixel row RN. The pixel signals are then supplied to the column processing section 23N via the column signal lines 42N for AD conversion.

At the same time, a pixel signal is read from the Gr pixel at (3, 2) in each of the shared pixel cells 41 on the even-numbered shared pixel row RS. The pixel signals are then supplied to the column processing section 23S via the column signal lines 42S for AD conversion.

During the first phase in the period of the next (N+3)-th pixel row, a pixel signal is read from the Gb pixel at (4, 1) in each of the shared pixel cells 41 on the odd-numbered shared pixel row RN. The pixel signals are then supplied to the column processing section 23N via the column signal lines 42N for AD conversion.

At the same time, a pixel signal is read from the Gb pixel at (4, 1) in each of the shared pixel cells 41 on the even-numbered shared pixel row RS. The pixel signals are then supplied to the column processing section 23S via the column signal lines 42S for AD conversion.

Thereafter, during the second phase in the period of the (N+3)-th pixel row, a pixel signal is read from the B pixel at (4, 2) in each of the shared pixel cells 41 on the odd-numbered shared pixel row RN. The pixel signals are then supplied to the column processing section 23N via the column signal lines 42N for AD conversion.

At the same time, a pixel signal is read from the B pixel at (4, 2) in each of the shared pixel cells 41 on the even-numbered shared pixel row RS. The pixel signals are then supplied to the column processing section 23S via the column signal lines 42S for AD conversion.

As described above, such pixel signal reading, i.e., pixel signal reading in the period of four pixel rows from every pixel on the two shared pixel rows being larger in number than the four pixel rows, is successively performed also on the remaining shared pixel rows on a two-shared-pixel-row basis similarly to the two odd- and even-numbered shared pixel rows RN and RS. This allows the image sensor 2 to perform normal imaging with which a pixel signal is read from every pixel in all of the shared pixel cells 41 at a predetermined frame rate.

Figure 14:
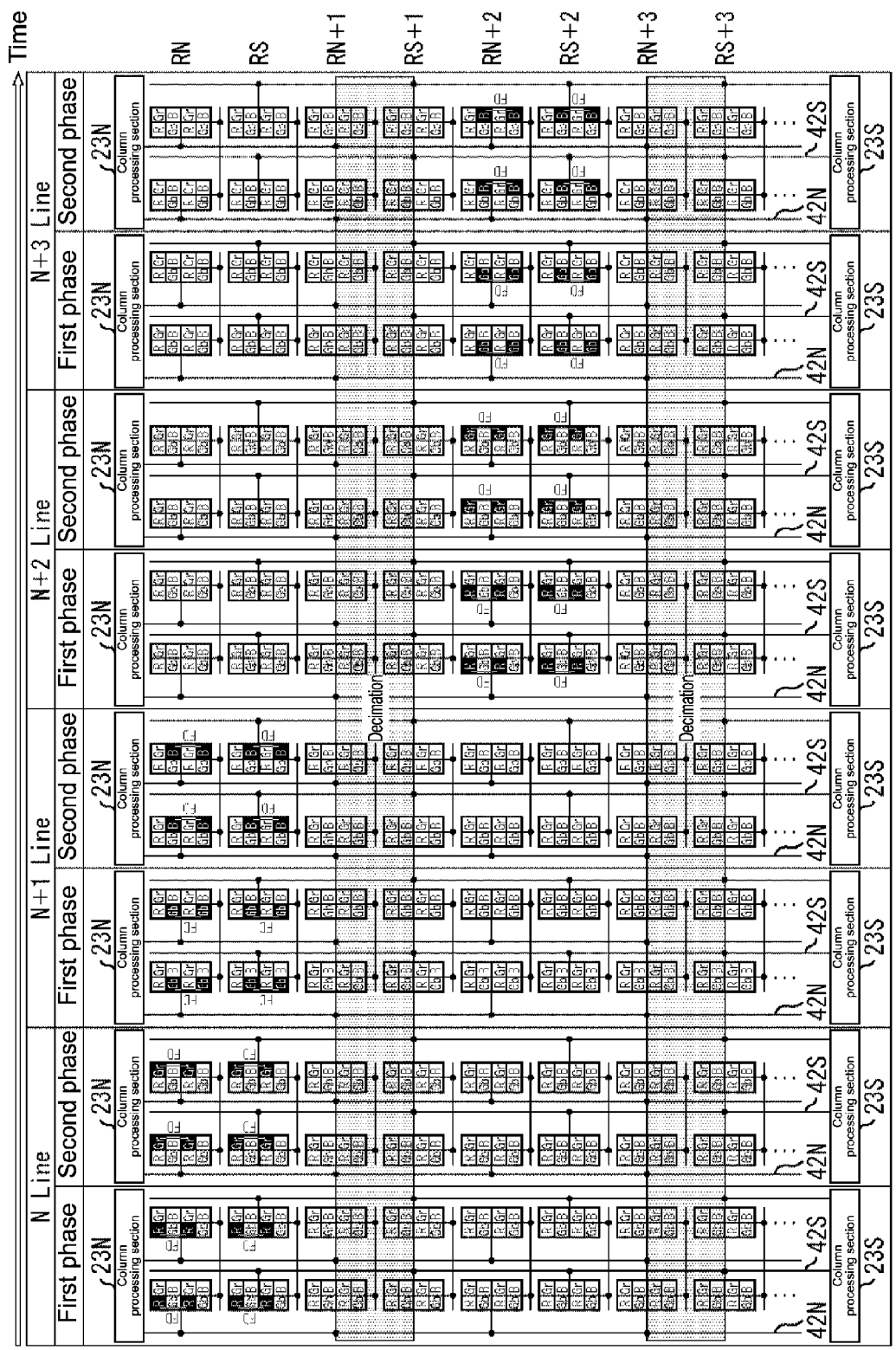
FIG. 14 is a diagram illustrating exemplary pixel signal reading from 2-by-4 shared pixel cells with ¼ pixel decimation under consistent access control.

FIG. 14 is a diagram illustrating exemplary pixel signal reading from the 2-by-4 shared pixel cells 41 with ¼ pixel decimation under consistent access control.

For reducing the number of pixel rows, in addition to skipping (a part of) the pixel rows for pixel signal reading as described above by referring to FIGS. 8 and 11, row addition is also an option. With row addition, a plurality of, e.g., two, pixel rows are converted into one pixel row by addition.

For row addition to reduce the number of pixel rows, FD addition may be utilized.

Such FD addition may be performed, under access control by the row control section 22, by pixel signal reading at the same time from the two (or more) pixels on the different pixel rows in each of the 2-by-4 shared pixel cells 41.

More specifically, for pixel signal reading at the same time from the two (or more) pixels in each of the shared pixel cells 41, the transfer Trs 62 (FIG. 5) in the two pixels in the shared pixel cell 41 are turned ON at the same time. The charge stored in the PDs 61 in the two pixels is then transferred to the FD for storage therein.

In this case, as to the charge stored in the PDs 61 in the two pixels in which the transfer Trs 62 are turned ON at the same time, the charge is added together in the FD. In response to the charge, a pixel signal is read onto the column signal line 42N or 42S. This pixel signal is equivalent to an addition signal, which is obtained if two pixel signals respectively read from the two pixels are added together.

As described above, when the transfer Trs 62 in the two pixels in the shared pixel cell 41 are turned ON at the same time, FD addition is performed, i.e., like adding together the two pixel signals respectively read from the two pixels in the FD, and the resulting pixel signal being an addition signal is read from the shared pixel cell 41.

In this example, row addition of converting M pixel rows into one pixel row by addition is sometimes referred to as M-row addition.

With FD addition, performing 2-row addition leads to ½ decimation of reducing the number of pixel rows to a half, for example.

In the example of FIG. 14, with ½ reading skipping and 2-row addition, the pixel rows are reduced to ¼, i.e., ¼ decimation is performed.

More specifically, in FIG. 14, during the first phase in the period of an N-th pixel row, from each of the shared pixel cells 41 on the odd-numbered shared pixel row RN, performed is reading of a pixel signal being an addition signal obtained by FD addition of pixel signals from the R pixels at (1, 1) and (3, 1). The pixel signals are then supplied to the column processing section 23N via the column signal lines 42N for AD conversion.

Also during the first phase in the period of the N-th pixel row, from each of the shared pixel cells 41 on the shared pixel row subsequent to the odd-numbered shared pixel row RN, i.e., the even-numbered shared pixel row RS, performed is reading of a pixel signal being an addition signal obtained by FD addition of pixel signals from the R pixels at (1, 1) and (3, 1). The pixel signals are then supplied to the column processing section 23S via the column signal lines 42S for AD conversion.

Thereafter, during the second phase in the period of the N-th pixel row, from each of the shared pixel cells 41 on the odd-numbered shared pixel row RN, performed is reading of a pixel signal being an addition signal obtained by FD addition of pixel signals from the Gr pixels at (1, 2) and (3, 2). The pixel signals are then supplied to the column processing section 23N via the column signal lines 42N for AD conversion.

Also during the second phase in the period of the N-th pixel row, from each of the shared pixel cells 41 on the even-numbered shared pixel row RS, performed is reading of a pixel signal being an addition signal obtained by FD addition of pixel signals from the Gr pixels at (1, 2) and (3, 2). The pixel signals are then supplied to the column processing section 23S via the column signal lines 42S for AD conversion.

During the first phase in the period of the next (N+1)-th pixel row, from each of the shared pixel cells 41 on the odd-numbered shared pixel row RN, performed is reading of a pixel signal being an addition signal obtained by FD addition of pixel signals from the Gb pixels at (2, 1) and (4, 1). The pixel signals are then supplied to the column processing section 23N via the column signal lines 42N for AD conversion.

At the same time, from each of the shared pixel cells 41 on the even-numbered shared pixel row RS, performed is reading of a pixel signal being an addition signal obtained by FD addition of pixel signals from the Gb pixels at (2, 1) and (4, 1). The pixel signals are then supplied to the column processing section 23S via the column signal lines 42S for AD conversion.

Thereafter, during the second phase in the period of the (N+1)-th pixel row, from each of the shared pixel cells 41 on the odd-numbered shared pixel row RN, performed is reading of a pixel signal being an addition signal obtained by FD addition of pixel signals from the B pixels at (2, 2) and (4, 2). The pixel signals are then supplied to the column processing section 23N via the column signal lines 42N for AD conversion.

At the same time, from each of the shared pixel cells 41 on the even-numbered shared pixel row RS, performed is reading of a pixel signal being an addition signal obtained by FD addition of pixel signals from the B pixels at (2, 2) and (4, 2). The pixel signals are then supplied to the column processing section 23S via the column signal lines 42S for AD conversion.

Such 2-row addition is performed as above by FD addition of pixel signals read from the same color-component pixels in each of the 2-by-4 shared pixel cells 41. As a result, the four pixel rows in one shared pixel row for the 2-by-4 shared pixel cells 41 are reduced in number to a half, i.e., reduced to two pixel rows.

In FIG. 14, the character of "FD" denotes that the pixel signals from the two pixels indicated by white-on-black characters are read after FD addition. This is applicable also to the drawings in the below.

After pixel signal reading with 2-row addition from the shared pixel cells 41 on the two consecutive odd- and even-numbered shared pixel rows RN and RS, the subsequent two consecutive odd- and even-numbered shared pixel rows RN+1 and RS+1 are skipped for pixel signal reading from the shared pixel cells 41 (from the 2-by-4 array therein) thereon.

With such a procedure as above, i.e., after pixel signal reading from the pixels on the two shared pixel rows, the subsequent two shared pixel rows are skipped for pixel signal reading (½ reading skipping), the 16 pixel rows in the four shared pixel rows (the sum of the two shared pixel rows and the subsequent two shared pixel rows) are reduced to a half, i.e., eight pixel rows.

As to the subsequent two consecutive odd- and even-numbered shared pixel rows RN+2 and RS+2, 2-row addition is performed similarly to the above. And as to the subsequent two consecutive odd- and even-numbered shared pixel rows RN+3 and RS+3, ½ reading skipping is performed for skipping pixel signal reading.

By signal reading with 2-row addition and ½ reading skipping similarly to the above, the pixel rows are reduced to ¼.

Pixel signal reading with ¼ decimation leads to high-speed imaging at a frame rate four times the frame rate for normal imaging.

Figure 15:
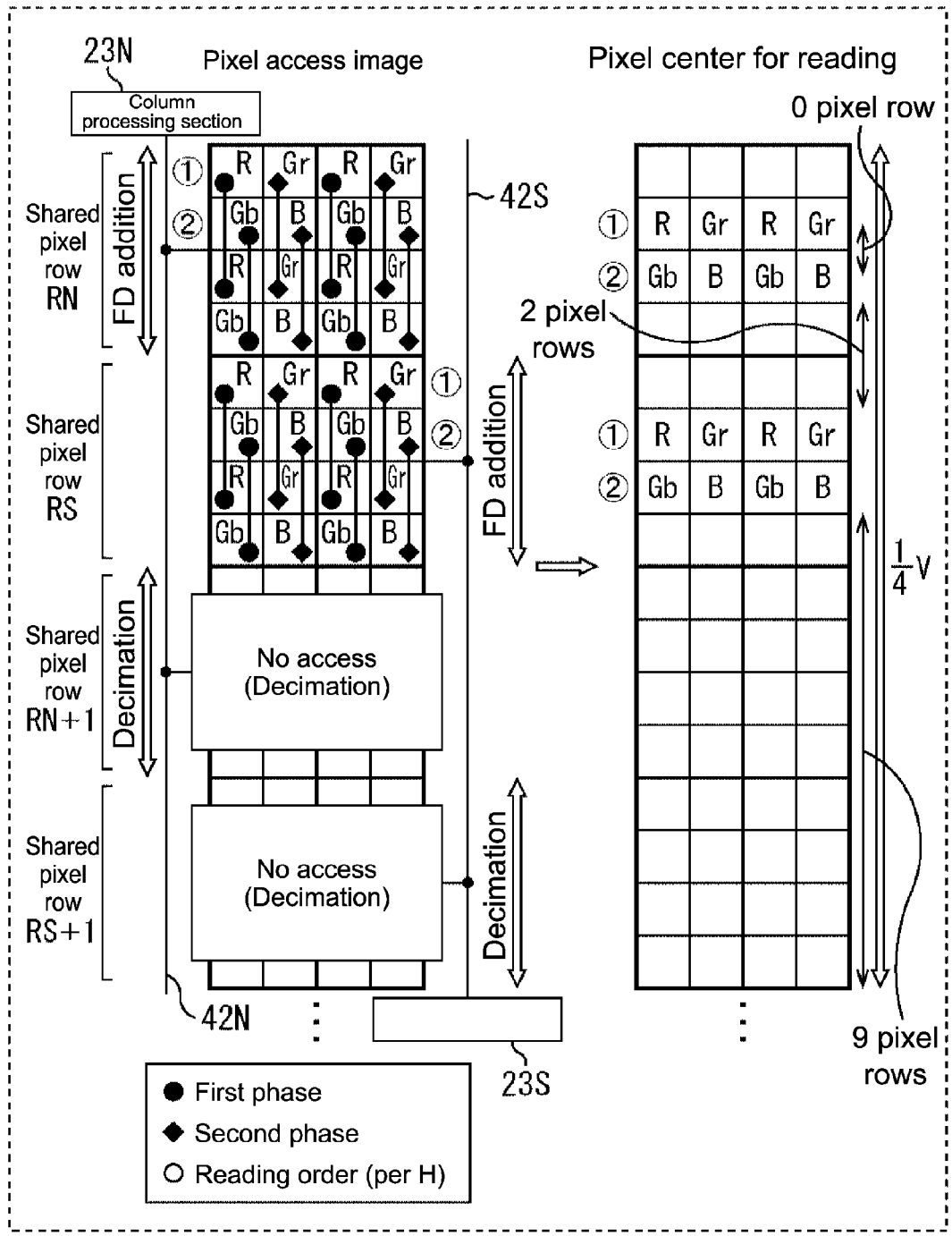
FIG. 15 is a diagram showing the center of pixels with values, which are the results of pixel signal reading with ¼ decimation of FIG. 14 under consistent access control.

FIG. 15 is a diagram showing the center of pixels with values, which are the results of pixel signal reading with ¼ decimation of FIG. 14 under consistent access control.

At the time of pixel signal reading with ¼ decimation of FIG. 14, such a process as above is repeated, i.e., the two shared pixel rows are subjected to 2-row addition, and then the subsequent two shared pixel rows are skipped for pixel signal reading.

After 2-row addition of FIG. 14, the pixel with a value obtained by the resulting pixel signal (addition signal) is centered between the two pixels subjected to 2-row addition (FD addition). The signal processing section 13 (FIG. 2) performs position adjustment on the pixel with a value obtained by the pixel signal being the result of 2-row addition, e.g., adjusts the pixel to be centered between the two pixels subjected to 2-row addition (FD addition).

As shown in FIG. 15, in the resulting frame image obtained by pixel signal reading with ¼ decimation of FIG. 14, repeatedly, the pixels are with values on the second and third pixel rows in the four pixel rows in each of the two consecutive shared pixel rows, and the pixels are with no value on the eight pixel rows in the two consecutive shared pixel rows.

In such an image obtained by pixel signal reading with ¼ decimation of FIG. 14, the pixel-value sampling interval (the interval between the pixel rows for the pixels with values) is not uniform as shown in FIG. 15, i.e., the interval may include no pixel row, two pixel rows, or nine pixel rows.

When the pixel-value sampling interval largely varies such as no pixel row, or two or nine pixel rows, the image quality may be degraded due to moire or false color as described above.

As such, reducing the number of pixel rows for high-speed imaging under consistent access control may degrade the image quality due to moire or false color. However, individual access control may prevent such degradation of the image quality.

Figure 16:
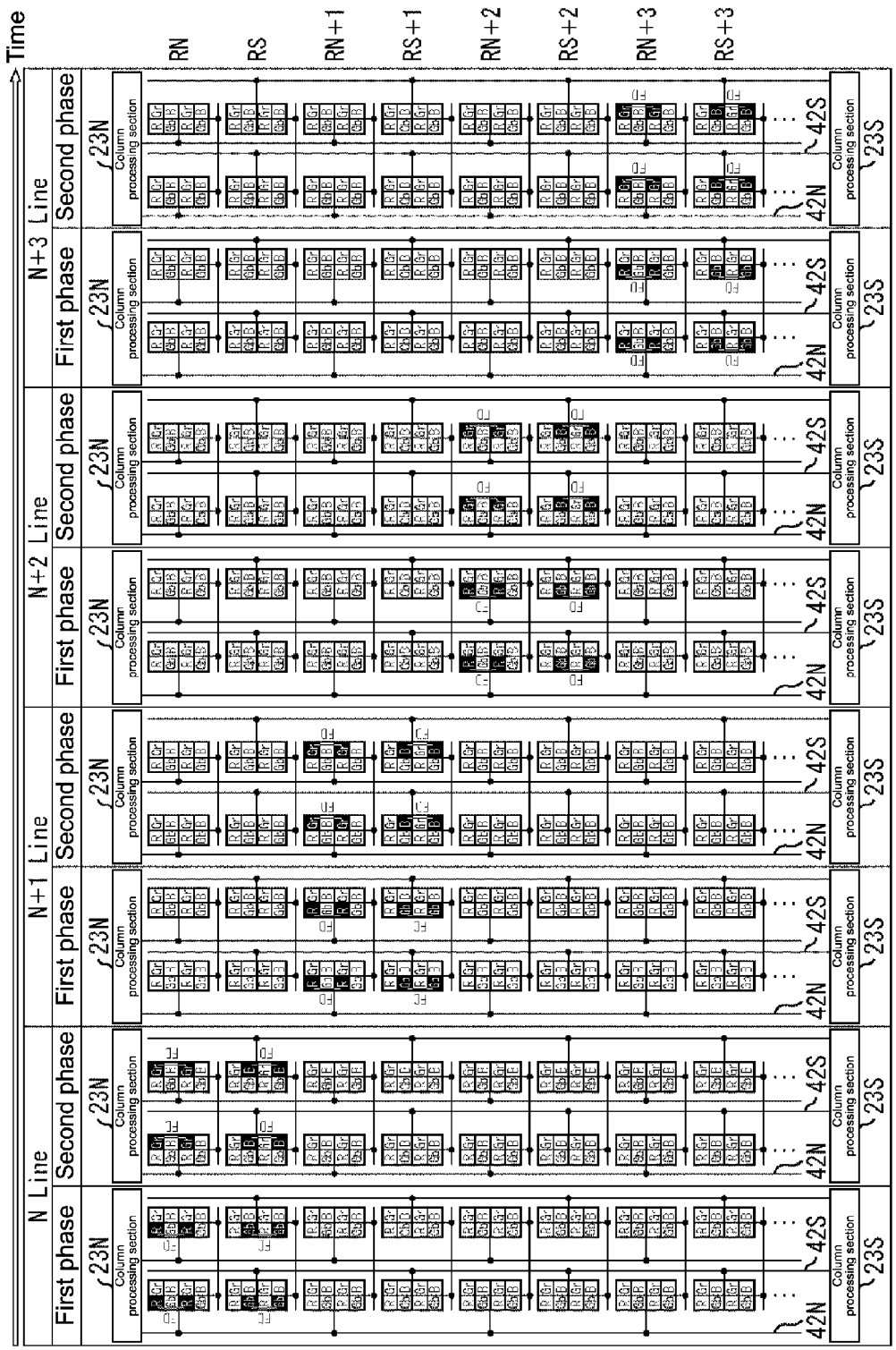
FIG. 16 is a diagram illustrating exemplary pixel signal reading from 2-by-4 shared pixel cells with ¼ pixel decimation under individual access control.

FIG. 16 is a diagram illustrating exemplary pixel signal reading from 2-by-4 shared pixel cells 41 with ¼ decimation under individual access control.

With individual access control, pixel signal reading from the 2-by-4 shared pixel cells 41 with ¼ decimation may be performed with ½ reading skipping and 2-row addition as below.

That is, in FIG. 16, during the first phase in the period of an N-th pixel row, from each of the shared pixel cells 41 on the odd-numbered shared pixel row RN, performed is reading of a pixel signal being an addition signal obtained by FD addition of pixel signals from the R pixels at (1, 1) and (3, 1). The pixel signals are then supplied to the column processing section 23N via the column signal lines 42N for AD conversion.

Also during the first phase in the period of the N-th pixel row, from each of the shared pixel cells 41 on the shared pixel row subsequent to the odd-numbered shared pixel row RN, i.e., the even-numbered shared pixel row RS, performed is reading of a pixel signal being an addition signal obtained by FD addition of pixel signals this time from Gb pixels at (2, 1) and (4, 1). The pixel signals are then supplied to the column processing section 23S via the column signal lines 42S for AD conversion.

As such, during the first phase in the period of the N-th pixel row, pixel signal reading is performed at the same time from the two consecutive odd- and even-numbered shared pixel rows RN and RS. More specifically, with individual access control, from each of the shared pixel cells 41 on the odd-numbered shared pixel row RN, performed is reading of a pixel signal being an addition signal obtained by FD addition of pixel signals from the R pixels at (1, 1) and (3, 1), and from each of the shared pixel cells 41 on the even-numbered shared pixel row RS, performed is reading of a pixel signal being an addition signal obtained by FD addition of pixel signals this time from the Gb pixels at (2, 1) and (4, 1).

Thereafter, during the second phase in the period of the N-th pixel row, from each of the shared pixel cells 41 on the odd-numbered shared pixel row RN, performed is reading of a pixel signal being an addition signal obtained by FD addition of pixel signals from the Gr pixels at (1, 2) and (3, 2). The pixel signals are then supplied to the column processing section 23N via the column signal lines 42N for AD conversion.

Also during the second phase in the period of the N-th pixel row, from each of the shared pixel cells 41 on the even-numbered shared pixel row RS, performed is reading of a pixel signal being an addition signal obtained by FD addition of pixel signals this time from the B pixels at (2, 2) and (4, 2). The pixel signals are then supplied to the column processing section 23S via the column signal lines 42S for AD conversion.

As such, during the second phase in the period of the N-th pixel row, pixel signal reading is performed at the same time from the two consecutive odd- and even-numbered shared pixel rows RN and RS. More specifically, with individual access control, from each of the shared pixel cells 41 on the odd-numbered shared pixel row RN, performed is reading of a pixel signal being an addition signal obtained by FD addition of pixel signals from the Gr pixels at (1, 2) and (3, 2), and from each of the shared pixel cells 41 on the even-numbered shared pixel row RS, performed is reading of a pixel signal being an addition signal obtained by FD addition of pixel signals this time from the B pixels at (2, 2) and (4, 2).

In this example, because a shared pixel row for the 2-by-4 shared pixel cells 41 means four pixel rows, the two consecutive odd- and even-numbered shared pixel rows RN and RS for simultaneous pixel signal reading mean eight pixel rows.

In the period of the N-th pixel row, in the above-mentioned manner, pixel signal reading is performed from the R and Gr pixels being the read-target pixels on the first and third (from the top) pixel rows in the eight pixel rows in the two shared pixel rows, i.e., on the first and third pixel rows in the odd-numbered shared pixel row RN. The resulting pixel signals from the read-target pixels are subjected to FD addition for reading.

Also in the period of the N-th pixel row, pixel signal reading is performed from the Gb and B pixels being the read-target pixels on the sixth and eighth pixel rows in the eight pixel rows in the two shared pixel rows, i.e., on the second and fourth pixel rows in the even-numbered shared pixel row RS. The resulting pixel signals from the read-target pixels are subjected to FD addition for reading.

In the above-mentioned manner, in the eight pixel rows in the two shared pixel rows, the first and third pixel rows are subjected to 2-row addition, and the sixth and eighth pixel rows are subjected to 2-row addition.

In the period of the N-th pixel row, in the eight pixel rows in the two shared pixel rows, the pixels on the remaining pixel rows are skipped for pixel signal reading, i.e., the second and fourth pixel rows, and the fifth and seventh pixel rows (the second and fourth pixel rows in the odd-numbered shared pixel row RN, and the first and third pixel rows in the even-numbered shared pixel row RS).

That is, in the eight pixel rows in the two shared pixel rows, the pixel rows not for 2-row addition are skipped for pixel signal reading, i.e., the second and fourth pixel rows, and the fifth and seventh pixel rows.

Therefore, in the period of the N-th pixel row, a half (½) of the eight pixel rows in the two shared pixel rows, i.e., the four pixel rows, is skipped for pixel signal reading, and the remaining four pixel rows are subjected to 2-row addition, thereby leading to ¼ decimation of reducing the original eight pixel rows to two.

In the period of the next (N+1)-th row, pixel signal reading is performed similarly to the period of the N-th row from the pixels on the two shared pixel rows subsequent to the even-numbered shared pixel row RS, i.e., the odd- and even-numbered shared pixel rows RN+1 and RS+1.

As a result, also in the period of the (N+1)-th pixel row, in the eight pixel rows in the two shared pixel rows, as to the pixels on the first and third pixel rows and those on the sixth and eighth pixel rows, i.e., the first and third pixel rows in the odd-numbered shared pixel row RN+1, and the second and fourth pixel rows in the even-numbered shared pixel row RS+1, pixel signals are read after FD addition. As to the pixels on the remaining second and fourth pixel rows and those on the fifth and seventh pixel rows, i.e., the second and fourth pixel rows in the odd-numbered shared pixel row RN+1, and the first and third pixel rows in the even-numbered shared pixel row RS+1, no pixel signal reading is performed by skipping.

Pixel signal reading with ¼ decimation from the pixels on the subsequent shared pixel rows leads to high-speed imaging at a frame rate four times the frame rate for normal imaging.

Figure 17:
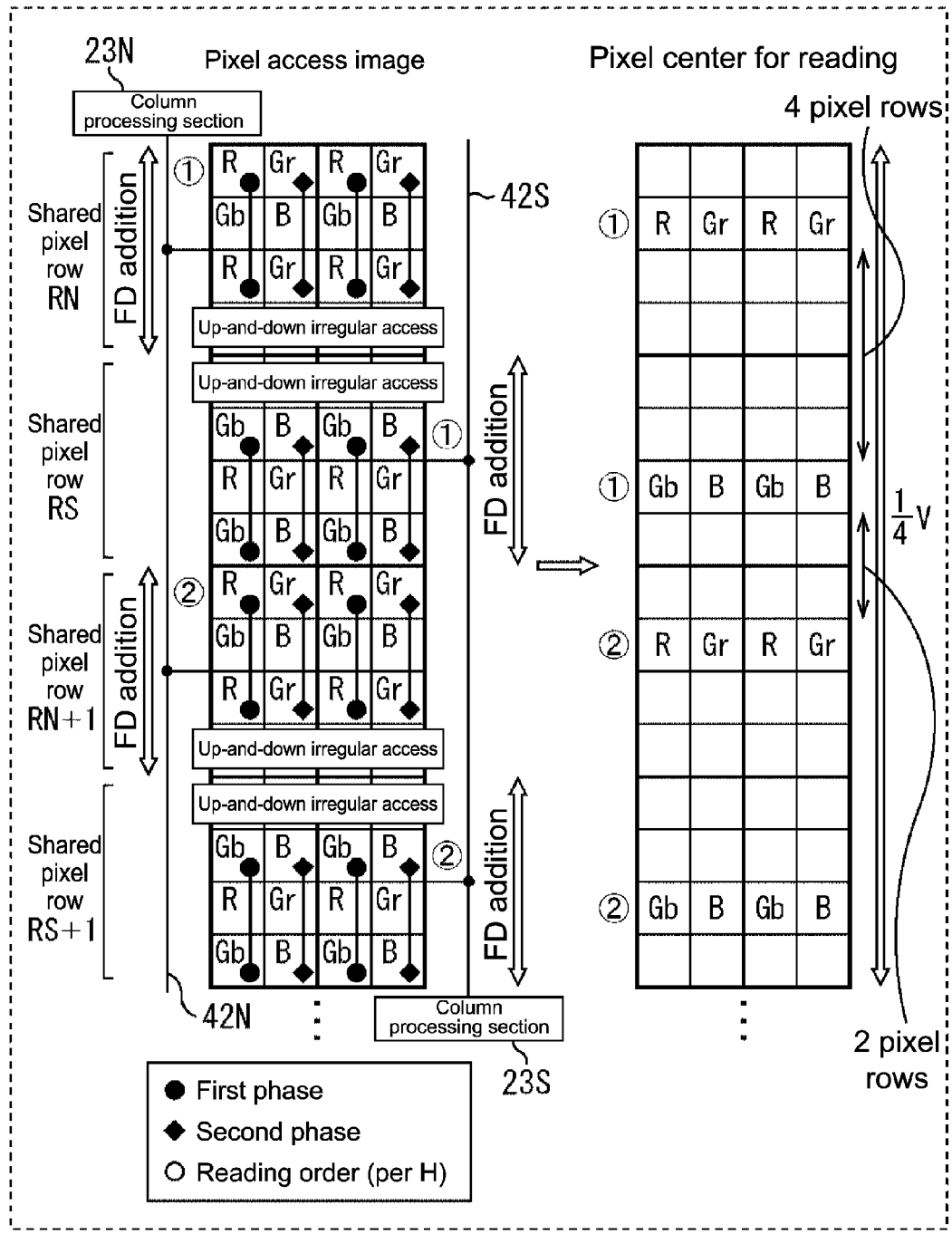
FIG. 17 is a diagram showing the center of pixels with values, which are the results of pixel signal reading with ¼ decimation of FIG. 16.

FIG. 17 is a diagram showing the center of pixels with values, which are the results of pixel signal reading with ¼ decimation of FIG. 16.

With pixel signal reading with ¼ decimation of FIG. 16, as described above, 2-row addition and ½ reading skipping are repeated on a 2-shared-pixel-row basis.

After 2-row addition of FIG. 16, the pixel with a value obtained by the resulting pixel signal (addition signal) is centered between the two pixels subjected to 2-row addition (FD addition). The signal processing section 13 (FIG. 2) performs position adjustment on the pixel with a value obtained by the pixel signal being the result of 2-row addition, e.g., adjusts the pixel to be centered between the two pixels subjected to 2-row addition (FD addition).

As shown in FIG. 17, in the resulting frame image obtained by pixel signal reading with ¼ decimation of FIG. 16, repeatedly, the pixels are with values on the second pixel row but not on the remaining three pixel rows in the four pixel rows in one shared pixel row, and the pixels are with values on the third pixel row but not on the remaining three pixel rows in the four pixel rows in the subsequent shared pixel row.

In such an image obtained by pixel signal reading with ¼ decimation of FIG. 16, the pixel-value sampling interval (the interval between the pixel rows for pixels with values) may vary as shown in FIG. 17, i.e., the interval may include two pixel rows or four pixel rows. Compared with the case of FIG. 15, the pixel value interval is (more) uniform.

This thus prevents degradation of the image quality to be caused by moire or false color better than in the case of FIG. 15.

As such, for pixel signal reading at the same time from the shared pixel cells 41 on the two shared pixel rows in the image sensor 2 adopting the shared pixel technology, individual access control is performed on the two shared pixel rows for pixel signal reading from the pixels in different positions in the shared pixel cells 41 thereon, high-speed imaging is achieved with control over degradation of the image quality compared with the case of no such individual access control, i.e., in the case that consistent access control is performed on the two shared pixel rows for pixel signal reading from the pixels in the same position in the shared pixel cells 41 thereon (FIGS. 14 and 15).

More specifically, with individual access control, pixel signal reading is performed from the pixels in the shared pixel cells 41 so as to allow FD addition of making the pixel-value sampling interval (the vertical interval between the pixels with values) as uniform as possible. This thus leads to high-speed imaging in the image sensor 2 adopting the shared pixel technology with control over degradation of the image quality.

[Individual Access Control]

Figure 18:
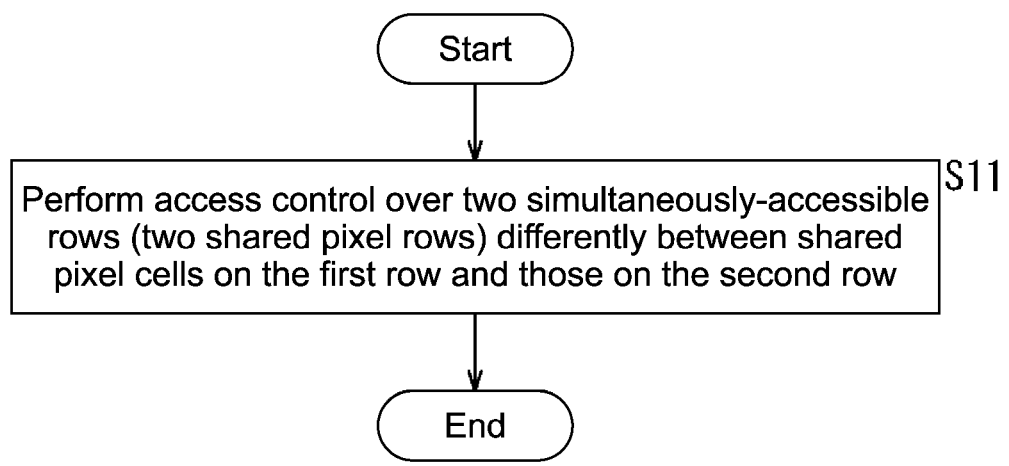
FIG. 18 is a flowchart illustrating individual access control by a row control section.

FIG. 18 is a flowchart for illustrating individual access control by the row control section 22.

In step S11, the row control section 22 performs individual access control differently over the two consecutive shared pixel rows from which simultaneous pixel signal reading is possible (to which simultaneous access is possible), i.e., to the shared pixel cells 41 on the odd-numbered shared pixel row, supplies control signals via the row control lines 43A, and to the shared pixel cells 41 on the even-numbered shared pixel row, supplies control signals via the row signal lines 43B being the different system from the row signal lines 43A.

Such individual access control allows pixel signal reading from pixels in different positions in the shared pixel cells 41 on the odd- and even-numbered shared pixel rows from which pixel signal reading is performed at the same time.

With individual access control, pixel signal reading is performed from the pixels in the shared pixel cells 41 so as to allow FD addition of making the pixel-value sampling interval as uniform as possible (making substantially uniform the pixel-value sampling interval). This thus leads to high-speed imaging in the image sensor 2 adopting the shared pixel technology with control over degradation of the image quality.

[SF Addition]

Figure 19:
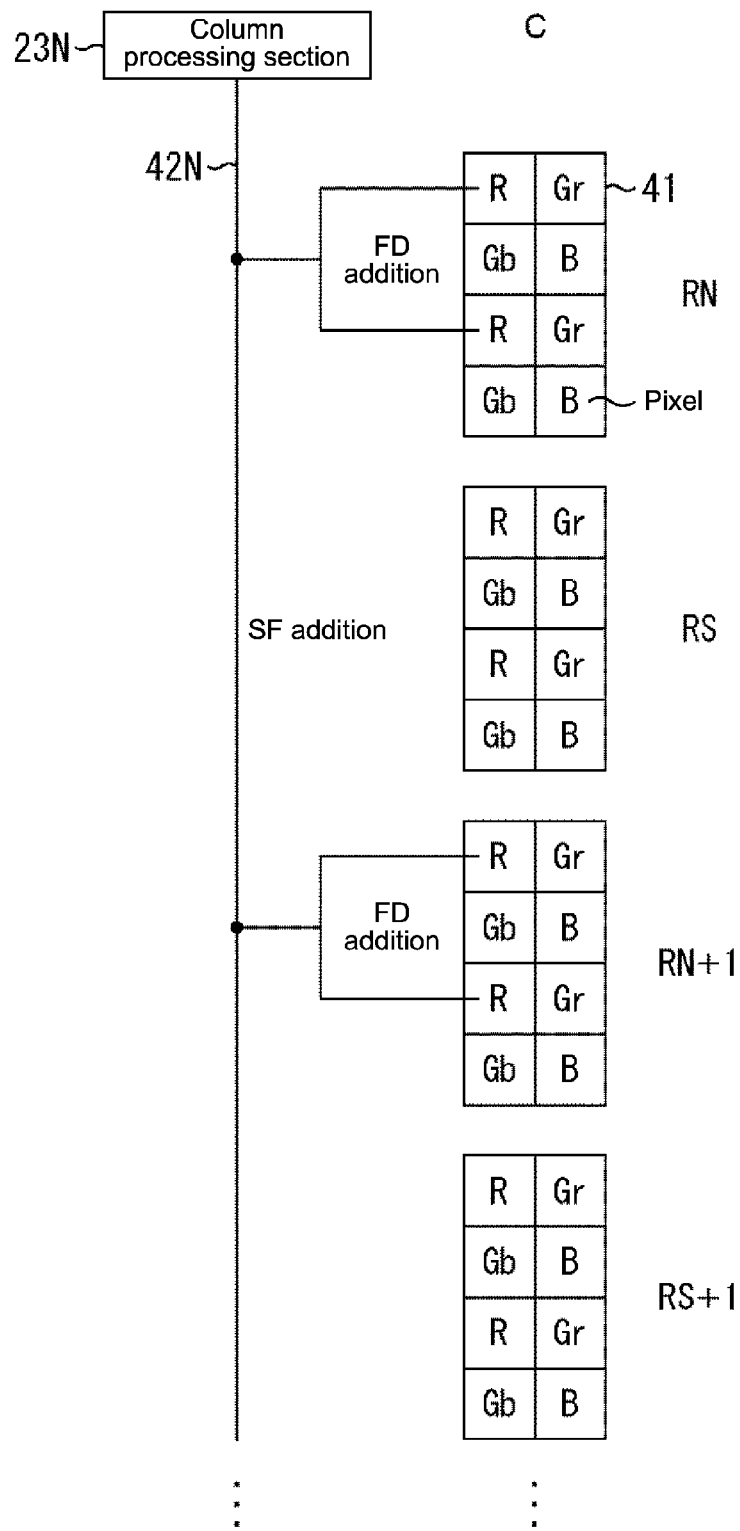
FIG. 19 is a diagram illustrating SF addition.

FIG. 19 is a diagram illustrating SF (Source Follower) addition.

For row addition, in addition to FD addition, SF addition is also an option.

As described above by referring to FIG. 5, a current source (not shown) is connected to the column signal lines 42N (and 42S), which are connected to the source of the selection Trs 65 in each of the shared pixel cells 41. This current source configures the circuit in an SF with the amplifier Tr 64 and the selection Tr 65.

Such SF addition is performed on the column signal lines 42N (or 42S) connected with the current source for the circuit in the SF.

In FIG. 19, with a certain column C including a plurality of odd-numbered shared pixel rows taken as an example, the shared pixel cells 41 on the odd-numbered rows in the column C are connected to the same column signal line 42N. As to the odd-numbered shared pixel rows for the shared pixel cells 41 in the column C, when the row control section 22 (FIG. 4) performs access control for simultaneous pixel signal reading from the shared pixel cells 41 connected to the same column signal line 42N, e.g., from the shared pixel cell 41 on the odd-numbered shared pixel row RN and the shared pixel cell 41 on the odd-numbered shared pixel row RN+1, SF addition is so performed as to add together the pixel signals read from these two shared pixel cells 41 on the column signal line 42. The resulting pixel signal is supplied to the column processing section 23N connected with the column signal line 42N.

More specifically, as an example, the row control section 22 performs access control of, from the shared pixel cell 41 on the odd-numbered shared pixel row RN, performing reading of a pixel signal being an addition signal obtained by FD addition of pixel signals from the R pixels at (1, 1) and (3, 1), and supplying the pixel signal onto the column signal line 42N. At the same time, the row control section 22 performs, from the shared pixel cell 41 on the subsequent odd-numbered shared pixel row RN+1, reading of a pixel signal being an addition signal obtained by FD addition of pixel signals from the R pixels at (1, 1) and (3, 1), and supplies the pixel signal onto the column signal line 42N. With such access control, the pixel signals supplied onto the column signal line 42N are subjected to SF addition thereon, i.e., the pixel signal obtained by FD addition of pixel signals from the R pixels at (1, 1) and (3, 1) in the shared pixel cell 41 on the odd-numbered shared pixel row RN, and the pixel signal obtained by FD addition of pixel signals from the R pixels at (1, 1) and (3, 1) in the shared pixel cell 41 on the odd-numbered shared pixel row RN+1.

The resulting pixel signal being an addition signal obtained by SF addition on the column signal line 42N is supplied to the column processing section 23N connected to the column signal line 42N.

Such access control is performed similarly over the remaining Gr, Gb, and B pixels on the odd-numbered shared pixel rows RN and RN+1, the remaining pairs of the odd-numbered shared pixel rows, and the even-numbered shared pixel rows. This leads to 2-row addition by FD addition and 2-row addition by SF addition so that pixel signal reading is performed with ¼ decimation.

With 2-row addition by SF addition as above in addition to ½ reading skipping and 2-row addition by FD addition as described by referring to FIGS. 16 and 17, pixel signal reading is performed with ⅛ decimation. Such pixel signal reading with ⅛ decimation leads to high-speed imaging at a frame rate eight times the frame rate for normal imaging.

The above-mentioned Patent Document 1 describes an image sensor that is configured by unit pixels, and includes a plurality of capacitors and a switch. The capacitors are connected in parallel to a column processing section in charge of AD conversion, and the switch selects which capacitor is connected to a column signal line.

With the image sensor in Patent Document 1, by the switch selecting which of the capacitors is connected to the column signal lines, capacitance addition is performed, i.e., when pixel signals read at the same time from the unit pixels on two different rows are supplied to the column processing section via the capacitor connected to the column signal lines, the pixel signals are subjected to weight addition.

Such an image sensor performing capacitance addition as above is also available for individual access control. Therefore, the image sensor available for individual access control of FIG. 4 may be configured for capacitance addition.

When the image sensor available for individual access control of FIG. 4 is configured for capacitance addition, the row control section 22 performs access control of reading pixel signals at the same time from the shared pixel cells 41 on a plurality of shared pixel rows, thereby providing the pixel signals read at the same time from the shared pixel cells 41 on the shared pixel rows to the column processing section via the capacitor connected to the column signal line. In this manner, the pixel signals read at the same time from the shared pixel cells 41 on a plurality of shared pixel rows are subjected to weight addition by capacitance addition before supply to the column processing section.

[Another Exemplary Detailed Configuration of Pixel Access Section 11]

Figure 20:
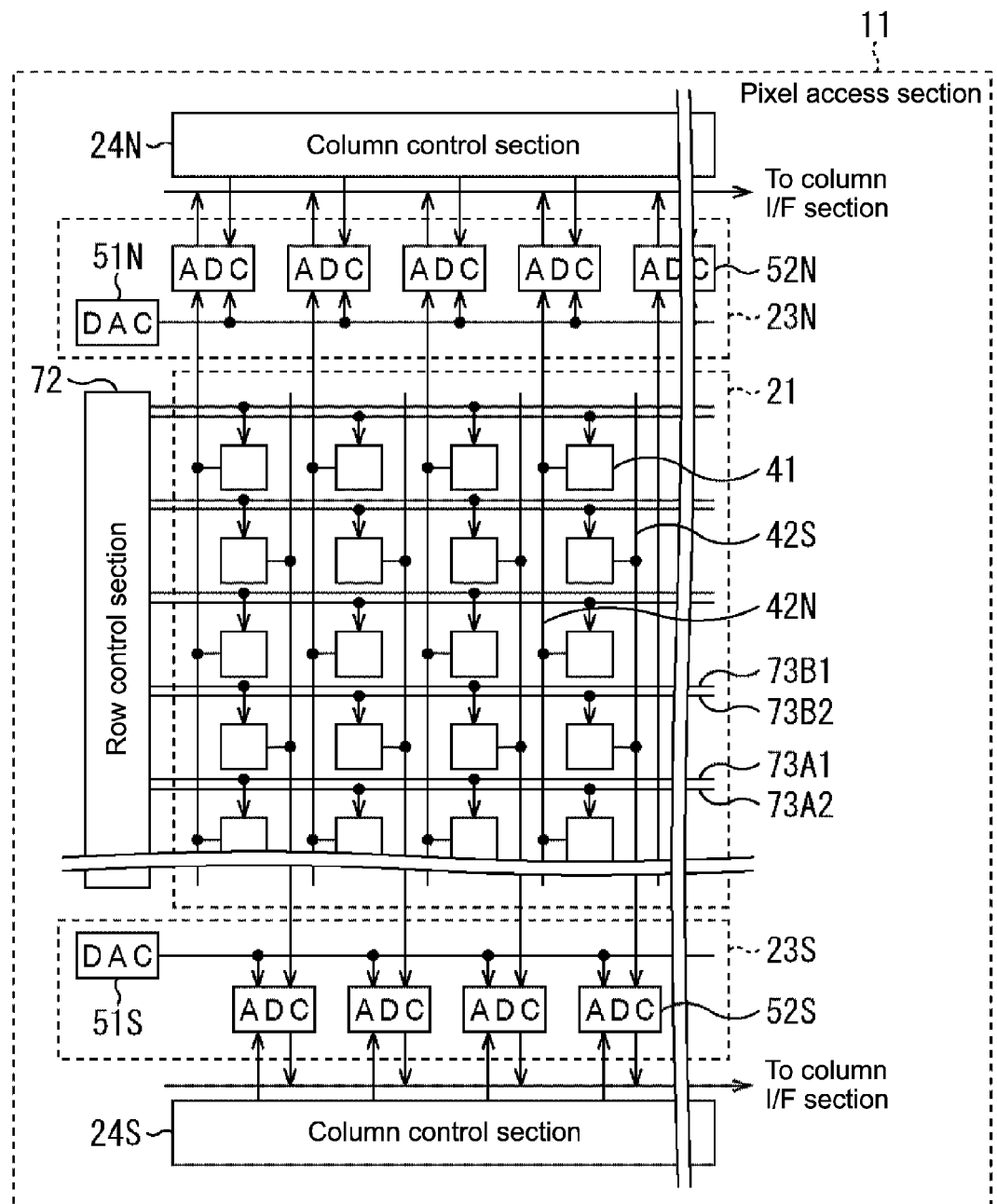
FIG. 20 is a block diagram showing another exemplary detailed configuration of the pixel access section of FIG. 2.

FIG. 20 is a block diagram showing another exemplary detailed configuration of the pixel access section 11 of FIG. 2.

In FIG. 20, any component corresponding to that of FIG. 4 is provided with the same reference numeral, and is not described again below if appropriate.

The pixel access section 11 of FIG. 20 is the same as that of FIG. 4 in the respect that the section includes the pixel array section 21, the column processing sections 23N and 23S, and the column control sections 24N and 24S.

The pixel access section 11 of FIG. 20 is the same as that of FIG. 4 also in the respect that the pixel array section 21 includes a plurality of shared pixel cells 41, the column processing section 23N includes the DAD 51N and the X ADCs 52N as many as the X columns for the shared pixel cells 41, and the column processing section 23S includes the DAC 51S and the X ADCs 52S.

The pixel access section 11 of FIG. 20 is the same as that of FIG. 4 in the respect that the section includes the column signal rows 42N and 42S.

In the pixel access section 11 of FIG. 20, however, a row control section 72 is provided as an alternative to the row control section 22, and row control lines 73A1 and 73A2, and 73B1 and 73B2 are provided as alternatives to the row signal lines 43A and 43B. These are the differences from that of FIG. 4.

Similarly to the row signal lines 43A, the row signal lines 73A1 73A2 are connected to the odd-numbered rows (odd-numbered shared pixel rows). The row control section 72 supplies (directs) control signals to the row signal lines 73A1 and 73A2, thereby performing access control over the shared pixel cells 41 on the odd-numbered rows.

Similarly to the row signal lines 43B, the row signal lines 73B1 and 73B2 are connected to the even-numbered rows (even-numbered shared pixel rows). The row control section 72 supplies control signals to the row signal lines 73B1 and 73B2, thereby performing access control over the shared pixel cells 41 on the even-numbered rows.

Herein, the row signal lines 73A1 are connected only to the shared pixel cells 41 in the odd-numbered columns on the odd-numbered rows, and the row signal lines 73A2 are connected only to the shared pixel cells 41 in the even-numbered columns on the odd-numbered rows.

The row signal lines 73B1 are connected only to the shared pixel cells 41 in the odd-numbered columns on the even-numbered rows, and the row signal lines 73B2 are connected only to the shared pixel cells 41 in the even-numbered columns on the even-numbered rows.

The row signal lines 73A1 and 73A2, and 73B1 and 73B2 are different systems so that the row control section 72 is allowed to provide different control signals thereto being the different systems.

This allows the row control section 72 to perform access control over the two odd- and even-numbered rows from which pixel signals (electric signals) are read at the same time differently between the shared pixel cells 41 on the odd-numbered row and those on the even-numbered row. This also allows the row control section 72 to perform access control differently over one and another columns on a row, i.e., an odd-numbered column and an even-numbered column.

In this case, as to the shared pixel cells 41 on the same row, pixel signal reading may be performed from the pixels in different positions depending on which column, i.e., odd- or even numbered column. This accordingly improves flexibility how to perform decimation, i.e., a skipping pattern for the pixel rows, or targets for row addition.

In this case, the pixel-value sampling interval (the interval between the pixel rows with values) is made more uniform in an image obtained by pixel signal decimation, thereby further preventing degradation of the image quality to be caused by moire or others.

[Other Exemplary Configuration of Image Sensor 2]

Figure 21:
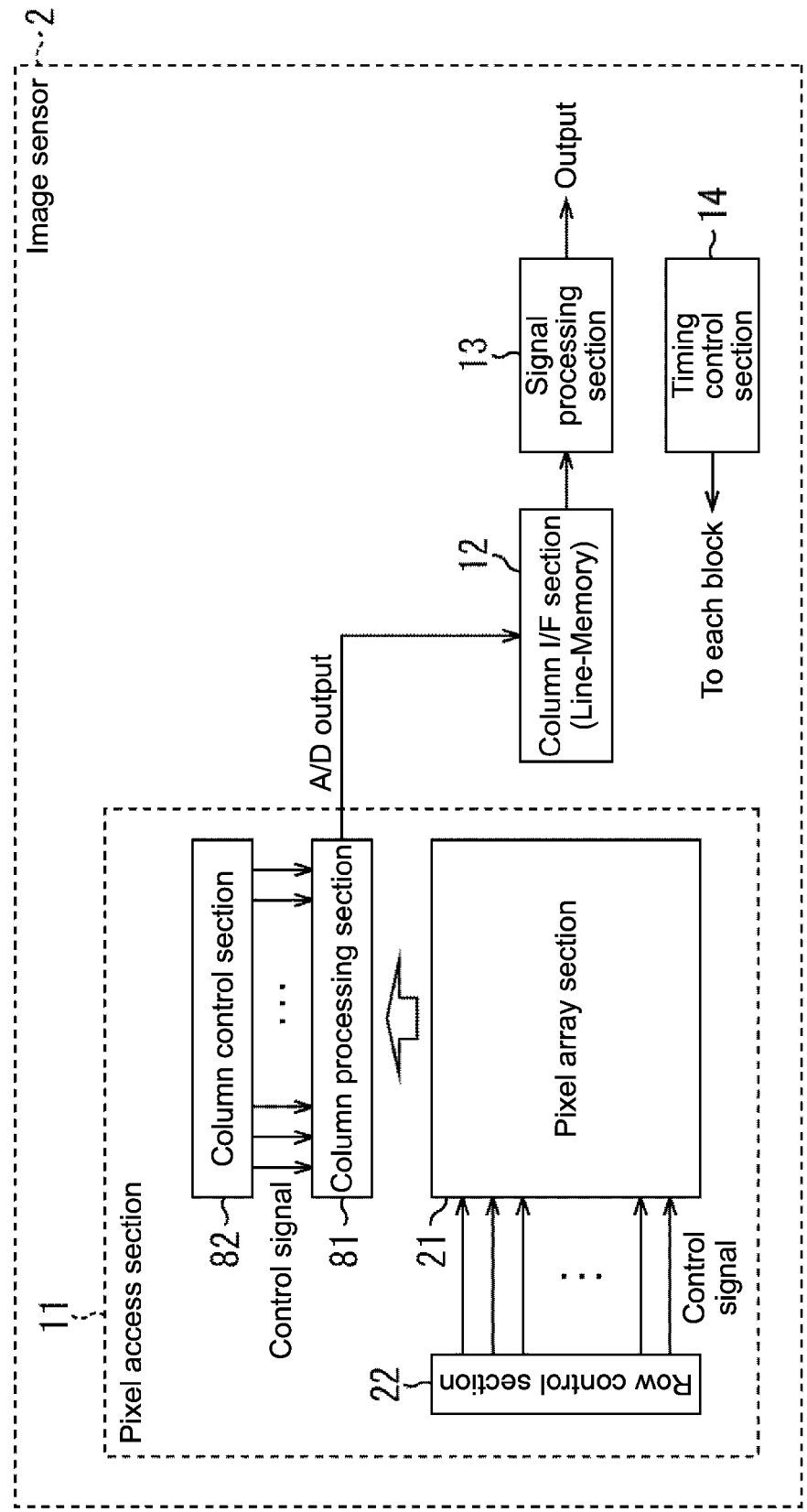
FIG. 21 is a block diagram showing another exemplary configuration of the image sensor of FIG. 1.

FIG. 21 is a block diagram showing another exemplary configuration of the image sensor 2 of FIG. 1.

In FIG. 21, any component corresponding to that of FIG. 2 is provided with the same reference numeral, and is not described again below if appropriate.

The image sensor 2 of FIG. 21 is the same as that of FIG. 2 in the respect that the sensor includes the pixel access section 11, the column I/F section 12, the signal processing section 13, and the timing control section 14.

The image sensor 2 of FIG. 21 is the same as that of FIG. 2 also in the respect that the pixel access section 11 includes the pixel array section 21, and the row control section 22.

In the image sensor 2 of FIG. 21, however, the pixel access section 11 includes a column processing section 81 as an alternative to the two column processing sections 23N and 23S, and a column control section 82 as an alternative to the two column control sections 24N and 24S. These are the differences from that of FIG. 2.

That is, in the image sensor 2 of FIG. 2, the column processing section 23N and the column control section 24N are provided on the upper end side of the column signal lines 42N and 42S (FIG. 4), and on the lower end side thereof, the column processing section 23S and the column control section 24S are provided. On the other hand, in the image sensor 2 of FIG. 21, the column processing section 81 and the column control section 82 are provided only on the upper end side of the column signal lines 42N and 42S.

Similarly to the column processing sections 23N and 23S, the column processing section 81 performs AD conversion or others on pixel signals coming from the pixel array section 21. The column processing section 81 then supplies the resulting digital signals to the column I/F section 12 as pixel values.

Similarly to the column control sections 24N and 24S, as to the pixel values obtained by the column processing section 81 by AD conversion or others, the column control section 82 performs column control for supply of the pixel values to the column I/F section 12.

Herein, the column processing section 81 includes a DAC and ADCs (not shown) similarly to the column processing sections 23N and 23S (FIG. 4).

The column processing section 23N (also the column processing section 23S) includes the ADCs 52N as many as the number of columns, i.e., X, for the shared pixel cells 41 (FIG. 4). On the other hand, the number of the ADCs in the column processing section 81 is equal to a value obtained by multiplying the number of columns for the shared pixel cells 41, i.e., X, by the number of rows for simultaneous pixel signal reading. The ADCs (AD conversion sections) in the column processing section 81 are for AD conversion of pixel signals read at the same time from the shared pixel cells 41 in each column on a plurality of rows.

That is, in the embodiment, the number of rows for the shared pixel cells 41 for simultaneous pixel signal reading is two, i.e., the number of the shared pixel rows. Therefore, the column processing section 81 includes 2X ADCs.

Herein, the configuration of including only one column processing section for AD conversion of pixel signals is referred to as single column configuration, and the configuration in which the column processing section is divided into a plurality of pieces is referred to as multi column configuration. In this sense, the image sensor 2 of FIG. 2 is the multi-column image sensor, and the image sensor 2 of FIG. 21 is the single-column image sensor.

As described above, in the multi-column image sensor 2 of FIG. 2 including the two column processing sections 23N and 23S, the column processing section 23N (also the column processing section 23S) includes X ADCs 52N. On the other hand, in the single-column image sensor 2 of FIG. 21 including only the column processing section 81, the column processing section 81 includes 2X ADCs.

The multi-column image sensor 2 of FIG. 2 including the two column processing sections 23N and 23S may be large in circuit size compared with the single-column image sensor 2 of FIG. 21 including only the column processing section 81. On the other hand, considering that the number of the ADCs 52N and 52S respectively in the column processing sections 23N and 23S is X, the multi-column image sensor 2 of FIG. 2 is easy to design due to sufficient space between the ADCs 52N and between the ADCs 52S compared with the single-column image sensor 2 of FIG. 21 including 2X ADCs.

On the other hand, considering that the column processing section 81 includes 2X ADCs, the single-column image sensor 2 of FIG. 21 is difficult to design due to not sufficient space between the ADCs therein compared with the multi-column image sensor 2 of FIG. 2 in which the column processing sections 23N and 23S respectively include X ADCs 52N and 52S. However, compared with the multi-column image sensor 2 of FIG. 2 including the two column processing sections 23N and 23S, the single-column image sensor 2 of FIG. 21 may be small in circuit size with only the column processing section 81 for AD conversion of pixel signals.

While the present disclosure has been described in detail, the foregoing description is in all aspects illustrative and not restrictive. It is understood that numerous other modifications and variations can be devised without departing from the scope of the present disclosure.

In the embodiment, described is the case where the shared pixel cell 41 is in the 2-by-2 or 2-by-4 array. The shared pixel cell 41 is not restricted to be in the 2-by-2 or 2-4-2 array, and may be in any other array.

Also in the embodiment, the color filter pattern is exemplified by the BAYER filter array, but the color filter pattern is not restricted to the BAYER filter array.

Also in the embodiment, a pixel signal is read at the same time from the shared pixel cells 41 on the two shared pixel rows. However, the present disclosure is applicable also to a case of reading a pixel signal at the same time from the shared pixel cells 41 on L shared pixel rows, where L denotes three.

If this is the case, the pixel access section 11 is expected to include L column signal lines with respect to a column for the shared pixel cells 41. Moreover, for access control differently over the L shared pixel rows for simultaneous pixel signal reading, i.e., for individual access control, the pixel access section 11 is expected to include row signal lines which are different R systems.

The present disclosure is applicable to every type of electronic apparatus provided with a function of imaging, including PCs (Personal Computers), mobile phones, tablets, smartphones, wearable cameras, and others in addition to digital cameras.

Furthermore, the effects described in this specification are by way of example only, and other effects may be produced thereby.

The present disclosure may be also in the following structures.

(1) An image sensor, including:
 a pixel array section configured to include two or more shared pixel cells arranged in a two-dimensional array, the shared pixel cells each including a plurality of pixels that output electric signals by photoelectric conversion;
 a column processing section configured to process the electric signals that are read at the same time from the shared pixel cells on a plurality of rows in the two-dimensional array; and
 a row control section configured to perform access control differently between one and another of the rows for reading the electric signals from the pixels in the shared pixel cells.

(2) The image sensor according to (1), in which
 a column for the shared pixel cells is connected with a plurality of column signal lines, and the electric signals read from the shared pixel cells are supplied to the column processing section via the column signal lines.

(3) The image sensor according to (2), in which
 the column processing section is provided on one and another end sides of the column signal lines.

(4) The image sensor according to (3), in which
 the one column for the shared pixel cells is connected with two of the column signal lines,
 one of the two column signal lines is connected to the shared pixel cells on any of the rows taking an odd number,
 the other of the two column signal lines is connected to the shared pixel cells on any of the rows taking an even number,
 the column processing section includes an AD conversion section configured to perform AD (Analog Digital) conversion on the electric signals that are read at the same time from the shared pixel cells in the one and other columns on each of the odd- and even-numbered rows,
 the column processing section provided on the one end side of the column signal lines
  includes the AD conversion section as many as the number of columns for the shared pixel cells, and
  performs the AD conversion on the electric signals from the shared pixel cells on the odd-numbered row, the electric signals being supplied via the one of the two column signal lines, and
 the row control section performs the access control of reading the electric signals from the pixels in different positions between the shared pixel cells on the odd-numbered row and the shared pixel cells on the even-numbered row.

(5) The image sensor according to any one of (1) to (4), in which
 the pixels in each of the shared pixel cells share an FD (Floating Diffusion), and
 the row control section reads an addition signal from the shared pixel cells by performing the access control of reading the electric signals at the same time from the two or more of the pixels sharing the FD, the addition signal being obtained by FD addition with which the electric signals read at the same time from the two or more of the pixels are added together in the FD.

(6) The image sensor according to (5), in which
 the row control section performs the access control to perform the FD addition with which a vertical interval is made substantially uniform between the pixels provided with values by the processing by the column processing section.

(7) The image sensor according to any one of (1) to (6), in which
 the row control section performs the access control differently also between one and another of the columns on one of the rows.

(8) The image sensor according to any one of (4) to (6), in which
 by the access control of reading the electric signals at the same time from the shared pixel cells that are on the plurality of rows and are connected to any one of the column signal lines, the row control section adds together the electric signals read at the same time from the shared pixel cells on the column signal line for supply to the column processing section.

(9) The image sensor according to (2), in which
 the column processing section
  is provided on one end side of the column signal lines, and includes an AD conversion section that performs AD (Analog Digital) conversion on the electric signals read at the same time from the shared pixel cells in the one and other columns on the rows, the AD conversion sections being provided as many as a multiplication number that is obtained by multiplying the number of columns for the shared pixel cells by the number of the TOWS.

(10) The image sensor according to (2), in which with a plurality of capacitors connected in parallel to the column processing section, and a switch to select which of the capacitors is connected to the column signal lines, by the access control of reading the electric signals at the same time from the shared pixel cells on the plurality of rows, the row control section performs weight addition on the electric signals that are read at the same time from the shared pixel cells on the plurality of rows for supply to the column processing section, the weight addition being performed by supplying the electric signals that are read at the same time from the shared pixel cells on the plurality of rows via one of the capacitors connected to the column signal lines.

(11) A control method, including:
in an image sensor including
a pixel array section configured to include two or more shared pixel cells arranged in a two-dimensional array, the shared pixel cells each including a plurality of pixels that output electric signals by photoelectric conversion, and
a column processing section configured to process the electric signals that are read at the same time from the shared pixel cells on a plurality of rows in the two-dimensional array,
performing access control differently between one and another of the rows for reading the electric signals from the pixels in the shared pixel cells.

(12) An electronic apparatus, including:
an optical system configured to gather light; and
an image sensor configured to capture an image by receiving the light with
a pixel array section configured to include two or more shared pixel cells arranged in a two-dimensional array, the shared pixel cells each including a plurality of pixels that output electric signals by photoelectric conversion,
a column processing section configured to process the electric signals that are read at the same time from the shared pixel cells on a plurality of rows in the two-dimensional array, and
a row control section configured to perform access control differently between one and another of the rows for reading the electric signals from the pixels in the shared pixel cells.

It should be understood by those skilled in the art that various modifications, combinations, sub-combinations and alterations may occur depending on design requirements and other factors insofar as they are within the scope of the appended claims or the equivalents thereof.

What is claimed is:

1. An image sensor comprising:
a pixel array circuitry having two or more shared pixel cells arranged in a two-dimensional array, shared pixel cells of the two or more shared cells including a plurality of pixels, wherein each pixel in the plurality of pixels is configured to output an electrical signal by photoelectric conversion;
a row control circuitry configured to perform access control differently between a first row and a second row of a plurality of rows for individually reading the electrical signal from the each pixel in the plurality of pixels in the shared pixel cells;
a column processing circuitry configured to process the electrical signals that are read at the same time from the shared pixel cells in the two-dimensional array,
wherein a column of the shared pixel cells is connected to a plurality of column signal lines, and wherein the electrical signals that are read from each of the shared pixel cells are supplied to the column processing circuitry via the plurality of column signal lines;
a plurality of capacitors connected in parallel to the column processing circuitry; and
a switch configured to select which of the plurality of capacitors is connected to the plurality of column signal lines,
wherein the row control circuitry is further configured to perform weight addition on the electrical signals that are read at the same time from the shared pixel cells, and wherein the weight addition is performed by supplying the electrical signals that are read at the same time from the shared pixel cells via one of the plurality of capacitors connected to the plurality of column signal lines.

2. The image sensor according to claim 1, wherein the column processing circuitry includes a first portion that is provided on a first side of the plurality of column signal lines and a second portion that is provided on a second side of the plurality of column signal lines.

3. The image sensor according to claim 2, wherein the column of the shared pixel cells is connected to two column signal lines of the plurality of column signal lines, wherein
a first column signal line of the two column signal lines is connected to the shared pixel cells in odd rows of the column of the shared pixel cells,
a second column signal line of the two column signal lines is connected to the shared pixel cells in even rows of the column of the shared pixel cells,
wherein the column processing circuitry further includes an AD conversion circuitry configured to perform Analog-to-Digital (AD) conversion of the electrical signals that are read at the same time from the shared pixel cells,
wherein the first portion of the column processing circuitry provided on the first side of the plurality of column signal lines includes the AD conversion circuitry for one or more columns of shared pixels cells including the column of the shared pixel cells, wherein the first portion of the column processing circuitry performs the AD conversion of the electrical signals from the shared pixel cells connected to the first column signal line, and
wherein the row control circuitry is configured to perform the access control of reading the electrical signal from the each pixel in the plurality of pixels in different positions between the shared pixel cells in the odd rows and the even rows of the column of the shared pixel cells.

4. The image sensor according to claim 3, wherein the plurality of pixels in each of the shared pixel cells share a Floating Diffusion (FD), wherein the row control circuitry is further configured to read an addition signal from the shared pixel cells by performing the access control of reading the electrical signals at the same time from two or more of the plurality of pixels sharing the FD, and wherein the addition signal is based on the FD addition of the electrical signals that are read at the same time from the two or more of the plurality of pixels.

5. The image sensor according to claim 4, wherein the row control circuitry is further configured to perform the FD addition with which a vertical interval is made substantially uniform between the plurality of pixels.

6. The image sensor according to claim 3, wherein the row control circuitry is further configured to perform the access control differently between the one or more columns of the shared pixel cells.

7. The image sensor according to claim 3, wherein
by the access control of reading the electrical signals at the same time from the shared pixel cells that are on the plurality of rows and are connected to any one of the plurality of column signal lines, the row control circuitry adds together the electrical signals that are read at the same time from the shared pixel cells on the any one of the plurality of column signal lines for supply to the column processing circuitry.

8. The image sensor according to claim 1, wherein the column processing circuitry is provided on a first side of the plurality of column signal lines, wherein the column processing circuitry includes an AD conversion circuitry that is configured to perform Analog-to-Digital (AD) conversion of the electrical signals that are read at the same time from the shared pixel cells, and wherein the AD conversion circuitry includes a circuit portion for each of the two or more shared pixel cells arranged in the two-dimensional array.

9. A control method of an image sensor including a pixel array circuitry having two or more shared pixel cells arranged in a two-dimensional array, shared pixel cells of the two or more shared pixel cells having a plurality of pixels, a row control circuitry, a column processing circuitry, a plurality of capacitors connected in parallel to the column processing circuitry, and a switch, wherein a column of the shared pixel cells is connected to a plurality of column signal lines, the method comprising:
outputting, with each pixel in the plurality of pixels, an electrical signal by photoelectric conversion;
performing, with the row control circuitry, access control differently between a first row and a second row of a plurality of rows for individually reading the electrical signal from the each pixel in the plurality of pixels in the shared pixel cells;
selecting, with the switch, which of the plurality of capacitors is connected to the plurality of column signal lines;
performing, with the row control circuitry, weight addition on the electrical signals that are read at the same time from the shared pixel cells, and wherein the weight addition is performed by supplying the electrical signals that are read at the same time from the shared pixel cells via one of the plurality of capacitors connected to the plurality of column signal lines;
supplying, with the plurality of column signal lines, the electrical signals that are read at the same time from the shared pixel cells to the column processing circuitry; and
processing, with the column processing circuitry, the electrical signals that are read at the same time from the shared pixel cells in the two-dimensional array.

10. An electronic apparatus comprising:
an optical system configured to gather light:
an image sensor configured to capture an image by receiving the light, the image sensor including
a pixel array circuitry having two or more shared pixel cells arranged in a two-dimensional array, shared pixel cells of the two or more shared pixel cells including a plurality of pixels, wherein each pixel in the plurality of pixels is configured to output an electrical signal by photoelectric conversion,
a row control circuitry configured to perform access control differently between a first row and a second row of a plurality of rows for individually reading the electrical signal from the each pixel in the plurality of pixels in the shared pixel cells, and
a column processing circuitry configured to process the electrical signals that are read at the same time from the shared pixel cells in the two-dimensional array,
wherein a column of the shared pixel cells is connected to a plurality of column signal lines, and wherein the electrical signals that are read from each of the shared pixel cells are supplied to the column processing circuitry via the plurality of column signal lines;
a plurality of capacitors connected in parallel to the column processing circuitry; and
a switch configured to select which of the plurality of capacitors is connected to the plurality column signal lines, wherein the row control circuitry is further configured to perform weight addition on the electrical signals that are read at the same time from the shared pixel cells, and wherein the weight addition is performed by supplying the electrical signals that are read at the same time from the shared pixel cells via one of the plurality of capacitors connected to the plurality of column signal lines.

11. The electronic apparatus according to claim 10, wherein the column processing circuitry includes a first portion that is provided on a first side of the plurality of column signal lines and a second portion that is provided on a second side of the plurality of column signal lines.

12. The electronic apparatus according to claim 11, wherein the column of the shared pixel cells is connected to two column signal lines of the plurality of column signal lines, wherein
a first column signal line of the two column signal lines is connected to the shared pixel cells in odd rows of the column of the shared pixel cells,
a second column signal line of the two column signal lines is connected to the shared pixel cells in even rows of the column of the shared pixel cells,
wherein the column processing circuitry further includes an AD conversion circuitry configured to perform Analog-to-Digital (AD) conversion of the electrical signals that are read at the same time from the shared pixel cells,
wherein the first portion of the column processing circuitry provided on the first side of the plurality of column signal lines includes the AD conversion circuitry for one or more columns of shared pixels cells including the column of the shared pixel cells, wherein the first portion of the column processing circuitry performs the AD conversion of the electrical signals from the shared pixel cells connected to the first column signal line, and
wherein the row control circuitry is configured to perform the access control of reading the electrical signal from the each pixel in the plurality of pixels in different positions between the shared pixel cells in the odd rows and the even rows of the column of the shared pixel cells.

13. The electronic apparatus according to claim 12, wherein the plurality of pixels in each of the shared pixel cells share a Floating Diffusion (FD), wherein the row control circuitry is further configured to read an addition signal from the shared pixel cells by performing the access control of reading the electrical signals at the same time from two or more of the plurality of pixels sharing the FD, and wherein the addition signal is based on the FD addition of the electrical signals that are read at the same time from the two or more of the plurality of pixels.

14. The electronic apparatus according to claim 13, wherein the row control circuitry is further configured to perform the FD addition with which a vertical interval is made substantially uniform between the plurality of pixels.

15. The electronic apparatus according to claim 12, wherein the row control circuitry is further configured to perform the access control differently between the one or more columns of the shared pixel cells.

16. The electronic apparatus according to claim 12, wherein by the access control of reading the electrical signals at the same time from the shared pixel cells that are on the plurality of rows and are connected to any one of the plurality of column signal lines, the row control circuitry is configured to add together the electrical signals that are read at the same time from the shared pixel cells on the any one of the plurality of column signal lines for supply to the column processing circuitry.

17. The electronic apparatus according to claim 10, wherein the column processing circuitry is provided on a first side of the plurality of column signal lines, wherein the column processing circuitry includes an AD conversion circuitry that is configured to perform Analog-to-Digital (AD) conversion of the electrical signals that are read at the same time from the shared pixel cells, and wherein the AD conversion circuitry includes a circuit portion for each of the two or more shared pixel cells arranged in the two-dimensional array.

* * * * *